(12) United States Patent
Roty et al.

(10) Patent No.: US 12,350,982 B2
(45) Date of Patent: Jul. 8, 2025

(54) LOW-NOISE TIRE AND METHOD FOR MANUFACTURING SAME

(71) Applicant: COMPAGNIE GENERALE DES ETABLISSEMENTS MICHELIN, Clermont-Ferrand (FR)

(72) Inventors: Gael Roty, Clermont-Ferrand (FR); Jose Merino Lopez, Clermont-Ferrand (FR); Olivier Muhlhoff, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 86 days.

(21) Appl. No.: 17/769,143

(22) PCT Filed: Oct. 15, 2020

(86) PCT No.: PCT/FR2020/051837
§ 371 (c)(1),
(2) Date: Apr. 14, 2022

(87) PCT Pub. No.: WO2021/074533
PCT Pub. Date: Apr. 22, 2021

(65) Prior Publication Data
US 2024/0109370 A1    Apr. 4, 2024

(30) Foreign Application Priority Data

Oct. 16, 2019   (FR) ...................................... 1911529

(51) Int. Cl.
*B60C 5/14*    (2006.01)
*B29D 30/06*   (2006.01)
(Continued)

(52) U.S. Cl.
CPC ............ *B60C 5/14* (2013.01); *B29D 30/3007* (2013.01); *B60C 19/002* (2013.01); *B29D 2030/0682* (2013.01)

(58) Field of Classification Search
CPC ..... B60C 5/14; B60C 5/142; B60C 2005/145; B60C 9/09; B60C 9/07; B60C 9/08; B60C 2005/147; B29D 2030/0682
See application file for complete search history.

(56) References Cited

U.S. PATENT DOCUMENTS 3,327,753 A    6/1967  Travers
3,933,565 A    1/1976  Printz et al.
(Continued)

FOREIGN PATENT DOCUMENTS

CN    104395103 A    3/2015
CN    105722693 A    6/2016
(Continued)

OTHER PUBLICATIONS

Machine translation of JP 2017-202753, 2017.*
International Search Report dated Nov. 30, 2020, in corresponding PCT/FR2020/051837 (6 pages).

*Primary Examiner* — Justin R Fischer
(74) *Attorney, Agent, or Firm* — VENABLE LLP

(57) ABSTRACT

A tire comprises a sealing layer comprising a junction (21) extending in a main direction (D4) forming, with the circumferential direction (Z) of the tire: in a portion (15S) of the sealing layer extending axially in radial line with the working layer, an angle (ES) ranging, in absolute value, from 20° to 60°, and in a portion (15F) of the sealing layer extending radially in each sidewall, an angle (EF), in absolute value, strictly greater than the angle (ES) of the main (Continued)

direction (D4) of the junction (21) in the portion (15S) of the sealing layer extending axially in radial line with the working layer.

18 Claims, 17 Drawing Sheets

(51) Int. Cl.
  B29D 30/30 (2006.01)
  B60C 19/00 (2006.01)

(56) References Cited

U.S. PATENT DOCUMENTS

| | | | |
|---|---|---|---|
| 4,946,525 | A | 8/1990 | Aupic et al. |
| 5,062,462 | A | 11/1991 | Rye et al. |
| 5,702,548 | A | 12/1997 | Arnaud et al. |
| 5,709,760 | A | 1/1998 | Prakash et al. |
| 6,802,923 | B2 | 10/2004 | Ahouanto et al. |
| 8,696,846 | B2 | 4/2014 | Matsuda |
| 10,160,264 | B2 | 12/2018 | Hata |
| 10,689,780 | B2 | 6/2020 | Cornille et al. |
| 11,090,889 | B2 | 8/2021 | Pialot et al. |
| 11,124,030 | B2 | 9/2021 | Tanno |
| 2002/0096244 | A1 | 7/2002 | Ahouanto et al. |
| 2002/0157751 | A1 | 10/2002 | Armellin et al. |
| 2006/0027310 | A1 | 2/2006 | Auclair |
| 2009/0205770 | A1 | 8/2009 | Matsuda |
| 2014/0251522 | A1 | 9/2014 | Fukumoto |
| 2015/0217601 | A1 | 8/2015 | Seto et al. |
| 2015/0251495 | A1 | 9/2015 | Hata |
| 2016/0167438 | A1 | 6/2016 | Petitjean et al. |
| 2016/0297260 | A1 | 10/2016 | Tanno |
| 2017/0327976 | A1 | 11/2017 | Cornille et al. |
| 2017/0327977 | A1 | 11/2017 | Cornille et al. |
| 2017/0327978 | A1 | 11/2017 | Cornille et al. |
| 2018/0093532 | A1 | 4/2018 | Bestgen et al. |
| 2018/0117970 | A1 | 5/2018 | Le Clerc et al. |
| 2020/0316999 | A1 | 10/2020 | Rih et al. |
| 2020/0406565 | A1 | 12/2020 | Pialot et al. |
| 2021/0053398 | A1 | 2/2021 | Duchemin et al. |
| 2021/0155044 | A1 | 5/2021 | Rih et al. |
| 2021/0155045 | A1 | 5/2021 | Bosquet et al. |
| 2022/0243064 | A1 | 8/2022 | Fedurco et al. |
| 2022/0314564 | A1 | 10/2022 | Pialot et al. |
| 2023/0045626 | A1 | 2/2023 | Fedurco et al. |
| 2023/0061734 | A1 | 3/2023 | Fedurco et al. |
| 2023/0158762 | A1 | 5/2023 | Prost et al. |

FOREIGN PATENT DOCUMENTS

| | | | | |
|---|---|---|---|---|
| EP | 0319088 | A1 | 6/1989 | |
| EP | 1623819 | A1 | 2/2006 | |
| EP | 1842658 | A1 | 10/2007 | |
| EP | 2848430 | A1 | 3/2015 | |
| FR | 1413102 | A | 10/1965 | |
| FR | 2207010 | A1 | 6/1974 | |
| FR | 2797213 | A1 | 2/2001 | |
| FR | 3103821 | A1 | 6/2021 | |
| FR | 3107525 | A1 | 8/2021 | |
| JP | 6-80001 | A | 3/1994 | |
| JP | 2005-219550 | A | 8/2005 | |
| JP | 2005-297871 | A | 10/2005 | |
| JP | 2009-40117 | A | 2/2009 | |
| JP | 2013-10391 | A | 1/2013 | |
| JP | 2013-43303 | A | 3/2013 | |
| JP | 2017202753 | A | * 11/2017 | ............ B60C 13/02 |
| WO | 2016/091809 | A1 | 6/2016 | |
| WO | 2016/091810 | A1 | 6/2016 | |
| WO | 2016/091811 | A1 | 6/2016 | |
| WO | 2016/091812 | A1 | 6/2016 | |
| WO | 2016/166056 | A1 | 10/2016 | |
| WO | 2016/166057 | A1 | 10/2016 | |
| WO | 2019/122619 | A1 | 6/2019 | |
| WO | 2019/122620 | A1 | 6/2019 | |
| WO | 2019/158852 | A1 | 8/2019 | |
| WO | 2019/180352 | A1 | 9/2019 | |
| WO | 2019/180367 | A1 | 9/2019 | |
| WO | 2020/245115 | A1 | 12/2020 | |
| WO | 2021/019177 | A1 | 2/2021 | |
| WO | 2021/019178 | A1 | 2/2021 | |

* cited by examiner

LOW-NOISE TIRE AND METHOD FOR MANUFACTURING SAME

BACKGROUND

The present invention relates to a tyre and to methods for manufacturing such a tyre.

The prior art discloses tyres comprising a crown, two sidewalls and two beads, each sidewall connecting each bead to the crown. Each bead comprises at least one circumferential reinforcing element, generally in the form of a wire.

The tyre also comprises a carcass reinforcement anchored in each bead and extending in each sidewall and in the crown. The carcass reinforcement comprises a carcass layer comprising a portion wound around each circumferential reinforcing element.

The crown comprises a tread intended to come into contact with the ground during the rolling of the tyre as well as a crown reinforcement arranged radially between the tread and the carcass reinforcement. The crown reinforcement comprises a working reinforcement comprising two working layers.

Generally, the crown reinforcement also comprises a hoop reinforcement arranged radially outside the working reinforcement, the hoop reinforcement being delimited axially by two axial edges and comprising at least one hooping filamentary reinforcing element wound circumferentially helically so as to extend axially from one axial edge to the other axial edge of the hoop reinforcement in a main direction of the or each hooping filamentary reinforcing element.

In most cases, the tyre comprises a sealing layer for sealing against an inflation gas, the sealing layer being intended to delimit an internal cavity closed with a mounting support for the tyre once the tyre has been mounted on the mounting support, for example a rim. The sealing layer comprises a junction between two circumferential end edges of the sealing layer, the junction forming a radial overlap between one of the circumferential end edges of the sealing layer and the other of the circumferential end edges of the sealing layer, the junction extending in a main direction forming, with the circumferential direction of the tyre, a constant angle substantially equal to 90°.

Such a junction is responsible for a lack of uniformity generating vibrations capable of creating discomfort, in particular noise. However, it is desirable to reduce the vibrations emitted by the tyre, in particular to reduce the rolling noise emitted by the tyre.

JP2009040117 discloses modifying the angle formed by the main direction of the junction with the circumferential direction of the tyre. Thus, JP2009040117 teaches that an angle significantly less than 90° makes it possible to reduce the noise emitted by the tyre. In order to form such a junction, JP2009040117 discloses a method step in which, by winding the sealing ply around a support, a wound sealing assembly intended to form the sealing layer is formed, the sealing assembly being axially delimited by two axial edges of the wound sealing assembly. The main direction of the junction forms, with the circumferential direction of the support, a substantially constant angle over the whole of the axial width of the wound sealing assembly between the two axial edges. The smaller the angle, the more the junction extends circumferentially along a large circumferential length.

However, during the manufacturing method, a step of crosslinking a green blank comprising the wound sealing assembly is carried out. This crosslinking step is carried out in a crosslinking mould comprising a deformable membrane intended to apply a pressure on a radially internal surface of the wound sealing assembly.

Prior to the crosslinking step, the radially internal surface of the wound sealing assembly intended to come into contact with a radially and axially external surface of the deformable membrane is coated with an anti-adhesive composition during the crosslinking step. The anti-adhesive composition makes it possible to prevent, at the end of the crosslinking step, the membrane from remaining stuck to the sealing layer then formed and from damaging the latter. In order to prevent the anti-adhesive composition from penetrating into the tyre through the junction, a means of masking the junction is generally used, for example a cover, which has a circumferential length at least equal to the circumferential length of the junction.

Another solution, described in WO2019/158852, consists in using a membrane having a specific surface pattern making it possible to prevent adhesion of the membrane to the radially internal surface of the sealing assembly. However, even with such a membrane, the risk of adhesion is not completely eliminated and is all the larger the greater the circumferential length of the junction.

Now, in JP2009040117, the junction has a circumferential length that is all the greater the smaller the angle formed by the main direction of the junction with the circumferential direction.

In the case of using a masking means, it is then necessary to use a masking means having a relatively large circumferential length or else to position, with an angle substantially equal to that of the main direction of the junction, a masking means of reduced circumferential length. In the case of using a membrane having a specific surface pattern, too great a circumferential length leaves a risk of adhesion.

In both cases, the positioning of the masking means proves to be all the more long, tedious and risky the greater the circumferential length.

The object of the invention is to propose a tyre exhibiting an improved compromise between noise reduction and the productivity of its manufacturing method.

SUMMARY OF THE INVENTION

To this end, the invention relates to a tyre comprising a crown, two sidewalls and two beads, each sidewall connecting each bead to the crown, the tyre comprising a carcass reinforcement anchored in each bead and extending in each sidewall and radially internally at the crown, the crown comprising:

a tread intended to come into contact with the ground when the tyre is rolling, a crown reinforcement arranged radially between the tread and the carcass reinforcement, the carcass reinforcement comprising at least one carcass layer, the crown reinforcement comprising a working reinforcement comprising at least one working layer, the tyre comprising a sealing layer for sealing against an inflation gas, the sealing layer being intended to delimit an internal cavity closed with a mounting support for the tyre once the tyre has been mounted on the mounting support, the sealing layer comprising a junction between two circumferential end edges of the sealing layer, the junction forming a radial overlap between one of the circumferential end edges of the sealing layer and the other of the circumferential end edges of the sealing layer, the junction extending in a main direction forming, with the circumferential direction of the tyre:

in a portion of the sealing layer extending axially in radial line with the working layer or the radially innermost working layer and having an axial width equal to at least 40% of the axial width of the working layer or the radially innermost working layer, an angle ranging, in absolute value, from 20° to 60°, in a portion of the sealing layer extending radially in each sidewall and having a radial height equal to at least 5% of the radial height of the tyre, an angle, in absolute value, strictly greater than the angle of the main direction of the junction in the portion of the sealing layer extending axially in radial line with the working layer or the radially innermost working layer.

The tyre according to the invention has, on the one hand, a significantly reduced noise due to the angle formed by the main direction of the junction with the circumferential direction of the tyre in the portion of the sealing layer extending axially in radial line with the working layer or the radially innermost working layer. Specifically, with an angle, in absolute value, less than 60°, the noise generated by the junction is significantly reduced. However, if this angle becomes too small, the junction will extend over too great a circumferential length. Thus, the invention provides for this angle to be, in absolute value, greater than or equal to 20° so as to maintain a relatively reduced circumferential length.

An essential feature of the invention is that, in order to enable noise reduction, it is not necessary for the main direction of the junction to form an angle with the circumferential direction of the tyre over the whole of the axial width of the sealing layer between its two axial edges. Indeed, the inventors at the origin of the invention identified that the noise generated by the junction was mainly caused by the junction in the portion of the sealing layer extending axially in radial line with the contact area and the greater part of which extends axially in radial line with the working layer or, in the case of a plurality of working layers, with the radially innermost working layer.

This discovery then enabled them to reduce the circumferential length of the junction by giving a relatively high angle to the main direction of the junction in the portion of the tyre which played little or no part in the generation of noise, that is to say the sidewalls. Thus, the angle formed by the main direction of the junction with the circumferential direction of the tyre is as close to 90° as possible in the sidewalls, and in any case greater than the angle formed by the main direction of the junction with the circumferential direction of the tyre in radial line with the working layer or, in the case of a plurality of working layers, with the radially innermost working layer, so as to limit the circumferential length of the junction as much as possible.

In the portion of the wound sealing layer extending axially in radial line with the working layer or the radially innermost working layer, the main direction coincides with the curve of shortest length passing through:

a point located equidistant in the circumferential direction from each first point of each circumferential end edge located at one of the two axial ends of the portion of the sealing layer extending axially in radial line with the working layer or the radially innermost working layer, these two first points facing each other in the circumferential direction, and a point located equidistant in the circumferential direction from each second point of each circumferential end edge located at the other of the two axial ends of the portion of the sealing layer extending axially in radial line with the working layer or the radially innermost working layer, these two second points facing each other in the circumferential direction, the second points being located on the other side of the median plane of the tyre with respect to the first points.

In the portion of the sealing layer extending radially in each sidewall, the main direction coincides with the curve of shortest length passing through:

a point located equidistant in the circumferential direction from each first point of each circumferential end edge located at one of the two axial ends of the portion of the sealing layer extending radially in each sidewall, these two first points facing each other in the circumferential direction, and a point located equidistant in the circumferential direction from each second point of each circumferential end edge located at the other of the two axial ends of the portion of the sealing layer extending radially in each sidewall, these two second points facing each other in the circumferential direction, the second points being located radially outside with respect to the first points.

The sealing layer is arranged radially and axially inside the carcass reinforcement. The radially internal surface of the sealing layer is intended to be in contact with the inflation gas or to be at least partially covered with a self-sealing product.

DETAILED DESCRIPTION

The tyres of the invention are preferably intended for passenger vehicles. Such a tyre has a section in a meridian section plane characterized by a section width S and a section height H, within the meaning of the standard of the European Tyre and Rim Technical Organisation or "ETRTO", such that the ratio H/S, expressed as a percentage, is at most equal to 90, preferably at most equal to 80 and more preferably at most equal to 70 and is at least equal to 30, preferably at least equal to 40, and the section width S is at least equal to 115 mm, preferably at least equal to 155 mm and more preferably at least equal to 175 mm and at most equal to 385 mm, preferably at most equal to 315 mm, more preferably at most equal to 285 mm and even more preferably at most equal to 255 mm. In addition, the diameter at the hook D, defining the diameter of the tyre mounting rim, is at least equal to 12 inches, preferably at least equal to 16 inches and at most equal to 24 inches, preferably at most equal to 20 inches.

By axial direction is meant the direction substantially parallel to the main axis of the tyre, that is to say the axis of rotation of the tyre.

The expression circumferential direction means the direction that is substantially perpendicular both to the axial direction and to a radius of the tyre (in other words, tangent to a circle centred on the axis of rotation of the tyre).

The expression radial direction means the direction along a radius of the tyre, namely any direction that intersects the axis of rotation of the tyre and is substantially perpendicular to that axis.

The expression median plane of the tyre (denoted M) is understood to mean the plane perpendicular to the axis of rotation of the tyre which is situated at mid-axial distance between the two beads and passes through the axial middle of the crown reinforcement.

By equatorial circumferential plane of the tyre (denoted E) is meant the cylindrical surface passing through the equator of the tyre, perpendicular to the median plane and to the radial direction. The equator of the tyre is, in a meridian section plane (plane perpendicular to the circumferential direction and parallel to the radial and axial directions), the axis that is parallel to the axis of rotation of the tyre and located equidistantly between the radially outermost point of the tread that is intended to be in contact with the ground and the radially innermost point of the tyre that is intended to be in contact with a support, for example a rim, the distance between these two points being equal to H.

The term meridian plane is understood to mean a plane parallel to and containing the axis of rotation of the tyre and perpendicular to the circumferential direction.

The term bead is understood to mean the portion of the tyre intended to enable the tyre to be hooked onto a mounting support, for example a wheel comprising a rim. Thus, each bead is in particular intended to be in contact with a hook of the rim allowing it to be hooked.

By main direction in which a filamentary reinforcing element extends is meant the direction in which the filamentary reinforcing element extends along its greatest length. The main direction in which a filamentary reinforcing element extends may be rectilinear or curved, the reinforcing element being able to describe along its main direction a rectilinear or else wavy path.

By portion of the assembly, of a layer or of the tyre lying axially between the axial edges of a wound assembly or of a layer or of a reinforcement, there is understood a portion of the assembly, of the layer or of the tyre extending axially and lying between the radial planes passing through the axial edges of the wound assembly or of the layer or of the reinforcement.

By portion of a wound assembly intended to extend axially, portion of a wound assembly extending axially or portion of a layer extending axially in radial line with a reference assembly or a reference layer, there is understood a portion of said assembly or of said layer lying between the radial projections of the axial edges of the reference assembly or of the reference layer on said assembly or said layer.

Any range of values denoted by the expression "between a and b" represents the range of values from more than a to less than b (i.e. excluding the limits a and b), whereas any range of values denoted by the expression "from a to b" means the range of values from a up to b (i.e. including the strict limits a and b).

Concerning the main direction of the junction, in the tyre and the method, the angle considered is the angle, in absolute value, that is the smaller of the two angles defined between the reference straight line, here the circumferential direction of the tyre or of the support, and the main direction in which the junction extends.

Concerning each filamentary reinforcing element, in the tyre, the angle considered is the angle, in absolute value, that is the smaller of the two angles defined between the reference straight line, here the circumferential direction of the tyre, and the main direction in which the filamentary reinforcing element in question extends.

Concerning each filamentary reinforcing element, in the tyre and during the method, by orientation of an angle is meant the direction, clockwise or anti-clockwise, in which it is necessary to turn from the reference straight line, here the circumferential direction of the support or of the tyre, defining the angle to reach the main direction in which the filamentary reinforcing element in question extends.

Concerning each filamentary reinforcing element, during the method, the angles in question formed by the main directions in which the working and carcass filamentary reinforcing elements extend are by convention angles of opposite orientations and the angle formed by the main direction in which each working filamentary reinforcing element extends is, in absolute value, the smaller of the two angles defined between the reference straight line, here the circumferential direction of the support or of the tyre and the main direction in which the working filamentary reinforcing element extends. Thus, the angle formed by the main direction in which each working filamentary reinforcing element extends defines an orientation which is opposite to that formed by the angle of the main direction in which each carcass filamentary reinforcing element extends.

According to the invention, the main direction of the junction has, between the portions, transition zones where the angle is substantially variable. The portion of the sealing layer extending axially in line with the working layer or the radially innermost working layer and in which the main direction of the junction forms, with the circumferential direction of the tyre, a angle ranging, in absolute value, from 20° to 60° has an axial width equal to at least 40%, preferably at least 50%, of the axial width of the working layer or of the radially innermost working layer.

In embodiments in which the main direction of the junction has, between the portions, transition zones where the angle is substantially variable, the portion of the sealing layer extending axially in line with the working layer or the radially innermost working layer and in which the main direction of the junction forms, with the circumferential direction of the tyre, an angle ranging, in absolute value, from 20° to 60° has an axial width equal to at most 90%, preferably at most 80%, of the axial width of the working layer or the radially innermost working layer.

In embodiments in which the main direction of the junction has relatively short or even non-existent transition zones, the portion of the sealing layer extending axially in line with the working layer or the radially innermost working layer and in which the main direction of the junction forms, with the circumferential direction of the tyre, an angle ranging, in absolute value, from 20° to 60° has an axial width equal to at least 70%, preferably at least 80%, of the axial width of the working layer or the radially innermost working layer.

Preferably, whatever the embodiment, the median plane of the tyre intersects this portion of the sealing layer extending axially in line with the working layer or the radially innermost working layer. More preferably, this portion of the sealing layer extending axially in line with the working layer or the radially innermost working layer is axially centred on the median plane of the tyre.

According to the invention, the main direction of the junction has, between the portions, transition zones where the angle is substantially variable. Each portion of the sealing layer extending radially in each sidewall and in which the main direction of the junction forms, with the circumferential direction of the tyre, an angle strictly greater than that of the main direction of the junction in the portion of the sealing layer extending axially in line with the working layer or the radially innermost working layer has a radial height equal to at least 5%, preferably at least 15% and more preferably at less 30% of the radial height of the tyre.

In embodiments in which the main direction of the junction has, between the portions, transition zones where the angle is substantially variable, each portion of the sealing layer extending radially in each sidewall and in which the main direction of the junction forms, with the circumferential direction of the tyre, an angle strictly greater than that of the main direction of the junction in the portion of the sealing layer extending axially in line with the working layer or the radially innermost working layer, has a radial height equal to at most 80%, preferably at most 70% and more preferably at most 60%, of the radial height of the tyre.

In embodiments in which the main direction of the junction has relatively short or even non-existent transition zones, each portion of the sealing layer extending radially in each sidewall and in which the main direction of the junction forms, with the circumferential direction of the tyre, an angle strictly greater than that of the main direction of the junction in the portion of the sealing layer extending axially in line with the working layer or the radially innermost working layer has a radial height equal to at least 60%, preferably at least 70%, of the radial height of the tyre.

Preferably, whatever the embodiment, the equatorial circumferential plane of the tyre intersects each of these portions of the sealing layer located in each sidewall.

Advantageously, the main direction of the junction forms, with the circumferential direction of the tyre, an angle, in absolute value, greater than or equal to 25°, preferably greater than or equal to 30°, in the portion of the sealing layer extending axially in radial line with the working layer or the radially innermost working layer. Thus, the circumferential length of the junction is reduced as much as possible by limiting the angle in the portion of the sealing layer extending axially in line with the working layer or the radially innermost working layer.

Advantageously, the main direction of the junction forms, with the circumferential direction of the tyre, an angle, in absolute value, less than or equal to 50°, preferably less than or equal to 40°, in the portion of the sealing layer extending axially in radial line with the working layer or the radially innermost working layer. Thus, the noise generated by the junction is reduced as much as possible by limiting the angle in the portion of the sealing layer extending axially in line with the working layer or the radially innermost working layer.

Advantageously, the main direction of the junction forms, with the circumferential direction of the tyre, an angle, in absolute value, ranging from 80° to 90° in the portion of the sealing layer extending radially in each sidewall. Thus, the circumferential length of the junction is reduced as much as possible by limiting the angle in the portion of the sealing layer extending radially in each sidewall.

In advantageous embodiments, the average distance between each circumferential end edge ranges from 1 to 15 mm, preferably from 2 to 8 mm, in the portion of the sealing layer extending axially in radial line with the working layer or the radially innermost working layer. Thus, the unbalance created by the radial overlap is minimized, and therefore so are the vibrations liable to create discomfort and ultimately the noise emitted by the junction while ensuring a sufficiently strong junction.

Preferably, the average distance between each circumferential end edge ranges from 1 to 15 mm, preferably from 2 to 8 mm, over the entire axial width of the sealing layer between the axial edges of the sealing layer.

The term average distance is understood to mean the average of ten distances measured equally distributed over the axial width of the portion of the sealing layer extending axially in line with the working layer or the radially innermost working layer or over the entire axial width of the sealing layer between the axial edges of the sealing layer. Each distance is the curvilinear distance, and therefore taking into account the curvature of the tyre, and measured in the circumferential direction.

In advantageous embodiments, the average thickness of the sealing layer ranges from 0.4 to 1.6 mm, preferably from 0.9 to 1.4 mm, in the portion of the sealing layer extending axially in radial line with the working layer or the radially innermost working layer. Thus, by minimizing the average thickness of the sealing layer, the unbalance created by the radial overlap is minimized, and therefore so are the vibrations liable to create discomfort and ultimately the noise emitted by the junction.

Preferably, the average thickness of the sealing layer ranges from 0.4 to 1.6 mm, preferably from 0.9 to 1.4 mm over the entire axial width of the sealing layer between the axial edges of the sealing layer.

The term average thickness is understood to mean the average, on the one hand, of five thicknesses measured equally distributed over the axial width of the portion of the sealing layer extending axially in radial line with the working layer or the radially innermost working layer or over the entire axial width of the sealing layer between the axial edges of the sealing layer at a first azimuth and, on the other hand, of five thicknesses measured equally distributed over the axial width of the portion of the sealing layer extending axially in radial line with the working layer or the radially innermost working layer or over the whole of the axial width of the sealing layer between the axial edges of the sealing layer at a second azimuth located at 180° from the first azimuth. Each thickness is the straight distance between the radially external surface of the sealing layer and the radially internal surface of the sealing layer and is measured in the radial direction of the tyre. Of course, each thickness is measured outside the junction.

In embodiments making it possible to ensure relatively high sealing, the sealing layer comprises an elastomeric composition comprising an elastomeric matrix comprising at least 50 phr of one or more butyl elastomers.

The term part per hundred of elastomer or phr means the part by weight of a constituent per 100 parts by weight of the elastomer(s), that is to say of the total weight of the elastomer(s). Thus, a constituent at 50 phr will mean, for example, 50 g of this constituent per 100 g of elastomer.

By elastomeric matrix is meant all the elastomers of the elastomeric composition. Thus, the elastomeric matrix can in particular consist of a single elastomer but also of a blend of two or more elastomers.

By butyl elastomer is meant an isobutylene homopolymer or a copolymer of isobutylene and of isoprene, as well as the halogenated, in particular generally brominated or chlorinated, derivatives of these isobutylene homopolymers and copolymers of isobutylene and of isoprene.

Particularly preferably, the butyl elastomer(s) which can be used in the sealing layer are chosen from isobutylene rubbers, isobutylene-isoprene copolymers (IIR), bromobutyl rubbers such as bromoisobutylene-isoprene copolymer (BIIR) and chlorobutyl rubbers such as chloroisobutylene-isoprene copolymer (CIIR).

By extension of the preceding definition, the butyl elastomers will also include copolymers of isobutylene and of styrene derivatives, such as brominated isobutylene-methylstyrene copolymers (BIMSs), among which is included in particular the elastomer known as Exxpro sold by the company Exxon.

The butyl elastomer(s) which can be used in the sealing layer represent at least 50 phr, that is to say they represent at least 50% by weight of the total weight of the elastomeric matrix.

Other elastomers, for example diene elastomers, can also be present in the elastomeric matrix. The term diene elastomer should be understood as meaning, in a known manner, one or more elastomers derived at least in part (i.e. a homopolymer or a copolymer) from diene monomers (monomers bearing two conjugated or non-conjugated carbon-carbon double bonds).

In certain embodiments, it is possible to envisage an elastomeric composition comprising an elastomeric matrix comprising a thermoplastic elastomer, in particular a copolymer of isobutylene and of styrene (SIBS) and its derivatives.

The elastomeric composition may include other constituents. Thus, the elastomeric composition will comprise, in a preferred embodiment, a reinforcing filler, for example at least one carbon black.

Advantageously, the or each working layer is delimited axially by two axial edges of the or each working layer and comprises working filamentary reinforcing elements extending axially from one axial edge to the other axial edge of the or each working layer substantially parallel to one another in a main direction of each working filamentary reinforcing element, the main direction of each working filamentary reinforcing element of the or each working layer forming, with the circumferential direction of the tyre, an angle, in absolute value, strictly greater than 10°, preferably ranging from 15° to 50° and more preferably from 18° to 30°.

In one embodiment, the working reinforcement comprises a single working layer. The presence of a single working layer makes it possible in particular to lighten the tyre, therefore to reduce the energy dissipated by the hysteresis of the crown and therefore to reduce the rolling resistance of the tyre. In this embodiment, the working reinforcement is, with the exception of the working layer, devoid of any layer reinforced by filamentary reinforcing elements. The filamentary reinforcing elements of such reinforced layers excluded from the working reinforcement of the tyre comprise the metal filamentary reinforcing elements and the textile filamentary reinforcing elements. Very preferably, the working reinforcement is formed by the single working layer.

In another embodiment, the working reinforcement comprises two working layers. In this other embodiment, the main direction in which each working filamentary reinforcing element extends from one of the working layers and the main direction in which each working filamentary reinforcing element extends from the other of the working layers form, with the circumferential direction of the tyre, in the portion of the tyre delimited axially by the axial edges of the radially innermost working layer, angles of opposite orientations.

In one embodiment taken advantageously in combination with the embodiment in which the working reinforcement comprises a single working layer, the or each carcass layer is delimited axially by two axial edges of the or each carcass layer and comprises carcass filamentary reinforcing elements extending axially from one axial edge to the other axial edge of the or each carcass layer, each carcass filamentary reinforcing element extending in a main direction of each carcass filamentary reinforcing element, the main direction of each carcass filamentary reinforcing element of the or each carcass layer forming, with the circumferential direction of the tyre:

an angle, in absolute value, strictly less than 80° in a portion of the carcass layer extending axially in radial line with the working layer or the radially innermost working layer, an angle, in absolute value, ranging from 80° to 90° in at least one portion of the carcass layer extending radially in each sidewall.

In one variant of this embodiment in which the angle of each carcass filamentary reinforcing element differs between the sidewall and in radial line with the working layer or the radially innermost working layer, the carcass reinforcement comprises a single carcass layer.

In another variant of this embodiment in which the angle of each carcass filamentary reinforcing element differs between the sidewall and in radial line with the working layer or the radially innermost working layer, the carcass reinforcement comprises two carcass layers, the main directions of the carcass filamentary reinforcing elements of the two carcass layers being substantially parallel to one another.

In embodiments in which the main direction of each carcass filamentary reinforcing element has, between the portions, transition zones where the angle is substantially variable, the portion of the or each carcass layer extending axially in line with the working layer or the radially innermost working layer and in which the main direction of each carcass filamentary reinforcing element forms, with the circumferential direction of the tyre, an angle, in absolute value, strictly less at 80° has an axial width equal to at least 40%, preferably at least 50%, of the axial width of the working layer or the radially innermost working layer.

In embodiments in which the main direction of each carcass filamentary reinforcing element has, between the portions, transition zones where the angle is substantially variable, the portion of the or each carcass layer extending axially in line with the working layer or the radially innermost working layer and in which the main direction of each carcass filamentary reinforcing element forms, with the circumferential direction of the tyre, an angle, in absolute value, strictly less than 80° has an axial width equal to at most 90%, preferably at most 80%, of the axial width of the working layer or the radially innermost working layer.

Preferably, the median plane of the tyre intersects this portion of the or each carcass layer extending axially in line with the working layer or the radially innermost working layer. More preferably, this portion of the or each carcass layer extending axially in line with the working layer or the radially innermost working layer is axially centred on the median plane of the tyre.

In embodiments in which the main direction of each carcass filamentary reinforcing element has, between the portions, transition zones where the angle is substantially variable, each portion of the or each carcass layer extending radially in each sidewall and in which the main direction of each carcass filamentary reinforcing element forms, with the circumferential direction of the tyre, an angle, in absolute value, ranging from 80° to 90° has a radial height equal to at least 5%, preferably at least 15% and more preferably at least 30%, of the radial height of the tyre.

In embodiments in which the main direction of each carcass filamentary reinforcing element has, between the portions, transition zones where the angle is substantially variable, each portion of the or each carcass layer extending radially in each sidewall and in which the main direction of each carcass filamentary reinforcing element forms, with the circumferential direction of the tyre, an angle, in absolute value, ranging from 80° to 90° has a radial height equal to at most 80%, preferably at most 70% and more preferably at most 60%, of the radial height of the tyre.

Preferably, the equatorial circumferential plane of the tyre intersects each of these portions of the or each carcass layer located in each sidewall.

In this embodiment in which the angle of each carcass filamentary reinforcing element differs between the sidewall and in radial line with the working layer or the radially innermost working layer, a preferential compromise of performance of the tyre is obtained when the main direction of each carcass filamentary reinforcing element forms, with the circumferential direction of the tyre, an angle, in absolute value, greater than or equal to 10°, preferably ranging from 20° to 75° and more preferably ranging from 35° to 70°, in the portion of the carcass layer extending axially in radial line with the working layer or the radially innermost working layer.

In another embodiment taken advantageously in combination with the embodiment in which the working reinforcement comprises two working layers, the or each carcass layer is delimited axially by two axial edges of the or each carcass layer and comprises carcass filamentary reinforcing elements extending axially from one axial edge to the other axial edge of the or each carcass layer, each carcass filamentary reinforcing element extending in a main direction of each carcass filamentary reinforcing element, the main direction of each carcass filamentary reinforcing element of the or each carcass layer forming, with the circumferential direction of the tyre, a substantially constant angle over the whole of the axial width of the or each carcass layer between the axial edges of the or each carcass layer, preferably ranging, in absolute value, from 80° to 90°.

In one variant of this embodiment in which the angle of each carcass filamentary reinforcing element is substantially constant over the entire axial width of the or each carcass layer between the axial edges of the or each carcass layer, the carcass reinforcement comprises a single carcass layer.

In another variant of this embodiment in which the angle of each carcass filamentary reinforcing element is substantially constant over the whole of the axial width of the or each carcass layer between the axial edges of the or each carcass layer, the carcass reinforcement comprises two carcass layers, the main directions of the carcass filamentary reinforcing elements of the two carcass layers being substantially parallel to one another.

Whatever the embodiment described above, in each variant in which the carcass reinforcement comprises a single carcass layer, the carcass reinforcement is, with the exception of the single carcass layer, devoid of any layer reinforced by filamentary reinforcing elements. The filamentary reinforcing elements of such reinforced layers excluded from the carcass reinforcement of the tyre comprise metallic filamentary reinforcing elements and textile filamentary reinforcing elements. Very preferably, the carcass reinforcement consists of the single carcass layer.

Advantageously, in order to improve the uniformity of the tyre and to better distribute the junctions of the sealing layer and of the or each carcass layer, the or each carcass layer comprises a junction between two circumferential end edges of the or each carcass layer, the junction forming a radial overlap between one of the circumferential end edges of the or each carcass layer and the other of the circumferential end edges of the or each carcass layer, any point of the junction of the sealing layer being located at an azimuth offset by at least 60° and at most 300° from any point of the junction of the or each carcass layer.

In order to improve the performance of the tyre, in particular in terms of drift rigidity and at high speed, a very advantageous embodiment provides that the crown reinforcement comprises a hoop reinforcement arranged radially outside the working reinforcement, the hoop reinforcement being delimited axially by two axial edges of the hoop reinforcement and comprising at least one hooping filamentary reinforcing element wound circumferentially helically so as to extend axially from one axial edge to the other axial edge of the hoop reinforcement. The hoop reinforcement is thus radially interposed between the working reinforcement and the tread.

Hooping filamentary reinforcing elements suitable for implementing the method according to the invention are described in particular in documents WO2016166056, WO2016166057, WO2019122620, WO2016091809, WO2016091810, WO2016091811 and WO2016091812.

Advantageously, the or each hooping filamentary reinforcing element extending in a main direction of the or each hooping filamentary reinforcing element, the main direction of the or each hooping filamentary reinforcing element forms, with the circumferential direction of the tyre, an angle, in absolute value, less than or equal to 10°, preferably less than or equal to 7° and more preferably less than or equal to 5°.

In the tyre according to the invention, the crown comprises the tread and the crown reinforcement. The tread is understood to be a strip of polymeric, preferably elastomeric, material delimited:
  radially towards the outside by a surface intended to be in contact with the ground and
  radially towards the inside by the crown reinforcement.

The strip of polymeric material is formed by a layer of a polymeric material, preferably elastomeric or consisting of a stack of a number of layers, each layer consisting of a polymeric, preferably elastomeric, material.

In an advantageous embodiment, the crown reinforcement comprises a single hoop reinforcement and a single working reinforcement. Thus, the crown reinforcement is, with the exception of the hoop reinforcement and the working reinforcement, devoid of any reinforcement reinforced by filamentary reinforcing elements. The filamentary reinforcing elements of such reinforcements excluded from the crown reinforcement of the tyre comprise metallic filamentary reinforcing elements and textile filamentary reinforcing elements. Very preferably, the crown reinforcement is made up of the hoop reinforcement and the working reinforcement.

In a very preferred embodiment, the crown, apart from the crown reinforcement, does not have any reinforcement reinforced by filamentary reinforcing elements. The filamentary reinforcing elements of such reinforcements excluded from the crown of the tyre comprise metallic filamentary reinforcing elements and textile filamentary reinforcing elements. Very preferably, the crown is made up of the tread and the crown reinforcement.

In a very preferred embodiment, the carcass reinforcement is arranged so as to be directly radially in contact with the crown reinforcement and the crown reinforcement is arranged so as to be directly radially in contact with the tread. In this very preferred embodiment, the hoop reinforcement and the working layer or the radially outermost working layer are advantageously arranged directly radially in contact with one another.

The expression directly radially in contact means that the objects in question that are directly radially in contact with one another, in this case the layers, reinforcements or the tread, are not separated radially by any object, for example by any layer, reinforcement or strip interposed radially between the objects in question that are directly radially in contact with one another.

So as to preferentially guarantee effective triangulation of the crown of the tyre in the embodiment in which the angle of each carcass filamentary reinforcing element differs between the sidewall and in radial line with the working layer or the radially innermost working layer, the main direction of the or each hooping filamentary reinforcing element, the main direction of each working filamentary reinforcing element and the main direction of each carcass filamentary reinforcing element form, with the circumferential direction of the tyre, in a portion of the tyre lying axially between the axial edges of the axially narrowest layer or reinforcement among the working layer, the radially innermost working layer and the hoop reinforcement, paired angles different in absolute value. This is also referred to as a triangular mesh formed by the hooping, working and carcass filamentary reinforcing elements.

In other words, the or each hooping filamentary reinforcing element extending in a main hooping direction, each working filamentary reinforcing element extending in a main working direction, each carcass filamentary reinforcing element extending in a main carcass direction, these hooping, working and carcass directions are in twos different in the portion of the tyre delimited axially by the axial edges of the axially narrowest layer or reinforcement among the working layer, the radially innermost working layer and the hoop reinforcement.

In embodiments in which the main direction of each carcass filamentary reinforcing element has, between the portions, transition zones where the angle is substantially variable, the portion of the tyre lying axially between the axial edges of the axially narrowest layer or reinforcement among the working layer, the radially innermost working layer and the hoop reinforcement and in which the main direction of the or each hooping filamentary reinforcing element, the main direction of each working filamentary reinforcing element and the main direction of each carcass filamentary reinforcing element form, with the circumferential direction of the tyre, paired angles different in absolute value has an axial width equal to at least 40%, preferably at least 50%, of the axial width of the working layer or the radially innermost working layer.

In embodiments in which the main direction of each carcass filamentary reinforcing element has, between the portions, transition zones where the angle is substantially variable, the portion of the tyre lying axially between the axial edges of the the axially narrowest layer or reinforcement among the working layer, the radially innermost working layer and the hoop reinforcement and in which the main direction of the or each hooping filamentary reinforcing element, the main direction of each working filamentary reinforcing element and the main direction of each carcass filamentary reinforcing element form, with the circumferential direction of the tyre, paired angles different in absolute value has an axial width equal to at most 90%, preferably at most 80%, of the axial width of the working layer or the radially innermost working layer.

Preferably, the median plane of the tyre intersects this portion of the tyre lying axially between the axial edges of the axially narrowest layer or reinforcement among the working layer, the radially innermost working layer and the hoop reinforcement. More preferably, this portion of the tyre lying axially between the axial edges of the axially narrowest layer or reinforcement among the working layer, the radially innermost working layer and the hoop reinforcement is axially centred on the median plane of the tyre.

In order to further improve the triangulation of the crown of the tyre in the embodiment in which the angle of each carcass filamentary reinforcing element differs between the sidewall and in radial line with the working layer or the radially innermost working layer, the main direction of each working filamentary reinforcing element and the main direction of each carcass filamentary reinforcing element form, with the circumferential direction of the tyre, in a portion of the tyre lying axially between the axial edges of the working layer or the radially innermost working layer, angles of opposite orientations.

In embodiments in which the main direction of each carcass filamentary reinforcing element has, between the portions, transition zones where the angle is substantially variable, the portion of the tyre lying axially between the axial edges of the working layer or the radially innermost working layer and in which the main direction of each working filamentary reinforcing element and the main direction of each carcass filamentary reinforcing element form, with the circumferential direction of the tyre, angles of opposite orientations, has an axial width equal to at least 40%, preferably at least 50%, of the axial width of the working layer or the radially innermost working layer.

In embodiments in which the main direction of each carcass filamentary reinforcing element has, between the portions, transition zones where the angle is substantially variable, the portion of the tyre lying axially between the axial edges of the working layer or the radially innermost working layer and in which the main direction of each working filamentary reinforcing element and the main direction of each carcass filamentary reinforcing element form, with the circumferential direction of the tyre, angles of opposite orientations, has an axial width equal to at most 90%, preferably at most 80%, of the axial width of the working layer or the radially innermost working layer.

Preferably, the median plane of the tyre intersects this portion of the tyre lying axially between the axial edges of the working layer or the radially innermost working layer. More preferably, this portion of the tyre lying axially between the axial edges of the working layer or the radially innermost working layer is axially centred on the median plane of the tyre.

In one embodiment making it possible to easily anchor the carcass reinforcement in each bead, each bead comprises at least one circumferential reinforcing element, the or at least one of the carcass layer(s) comprising a portion of the or at least one of the carcass layer(s) wound around each circumferential reinforcing element, the main direction of each carcass filamentary reinforcing element forms, with the circumferential direction of the tyre:
  in the embodiment in which the angle of each carcass filamentary reinforcing element differs between the sidewall and in radial line with the working layer or the radially innermost working layer, an angle of each carcass filamentary reinforcing element, in absolute value, strictly greater than 0°, preferably ranging from 27° to 150° and more preferably ranging from 56° to 123°, in the wound portion of the or at least one of the carcass layer(s),
  in the embodiment in which the angle of each carcass filamentary reinforcing element is substantially constant over the entire axial width of the or each carcass layer between the axial edges of the or each carcass layer, an angle of each carcass filamentary reinforcing element ranging, in absolute value, from 80° to 90°.

Advantageously, the filamentary reinforcing elements of each layer are embedded in an elastomeric matrix. The different layers can comprise the same elastomeric matrix or else different elastomeric matrices.

An elastomeric matrix is understood to be a matrix that exhibits elastomeric behaviour in the crosslinked state. Such a matrix is advantageously obtained by crosslinking a composition comprising at least one elastomer and at least one other component. Preferably, the composition comprising at least one elastomer and at least one other component comprises an elastomer, a crosslinking system and a filler. The compositions used for these layers are conventional compositions for calendering reinforcers, typically based on natural rubber or other diene elastomer, a reinforcing filler such as carbon black, a curing system and usual additives. The adhesion between the filamentary reinforcing elements and the matrix in which they are embedded is ensured for example by an ordinary adhesive composition, for example an adhesive of the RFL type or an equivalent adhesive.

Advantageously, each working filamentary reinforcing element is metallic. The term metallic filamentary element is understood to mean a filamentary element formed from one or an assembly of a plurality of elementary monofilaments made entirely (for 100% of the threads) of a metallic material. Such a metallic filamentary element is preferably implemented with one or more threads made of steel, more preferably of pearlitic (or ferritic-pearlitic) carbon steel referred to as "carbon steel" below, or made of stainless steel (by definition steel comprising at least 11% chromium and at least 50% iron). However, it is of course possible to use other steels or other alloys. If a carbon steel is advantageously used, its carbon content (% by weight of steel) preferably ranges from 0.05% to 1.2%, in particular from 0.5% to 1.1%; these contents represent a good compromise between the mechanical properties required for the tyre and the feasibility of the threads. The metal or the steel used, whether it is in particular a carbon steel or a stainless steel, may itself be coated with a metallic layer which improves for example the implementation properties of the metallic cord and/or of its constituent elements, or the use properties of the cord and/or of the tyre themselves, such as properties of adhesion, corrosion resistance or resistance to ageing. According to a preferred embodiment, the steel used is covered with a layer of brass (Zn—Cu alloy) or of zinc. Each metallic elementary monofilament is, as described above, preferably made of carbon steel, and has a mechanical strength ranging from 1000 MPa to 5000 MPa. Such mechanical strengths correspond to the steel grades commonly encountered in the field of tyres, namely the NT (Normal Tensile), HT (High Tensile), ST (Super Tensile), SHT (Super High Tensile), UT (Ultra Tensile), UHT (Ultra High Tensile) and MT (Mega Tensile) grades, the use of high mechanical strengths potentially allowing improved reinforcement of the matrix in which the cord is intended to be embedded and lightening of the matrix reinforced in this way. The assembly of a plurality of elementary monofilaments can be coated with a polymeric material, for example as described in US20160167438.

First Method According to the Invention

Another subject of the invention is a first method for manufacturing a tyre as described above in which:

there is formed, by winding a sealing ply or a plurality of sealing plies around a support having a substantially cylindrical shape around a main axis, a wound sealing assembly intended to form the sealing layer, the wound sealing assembly comprising a junction between two circumferential end edges of the wound sealing assembly, the junction forming a radial overlap between one of the circumferential end edges of the wound sealing assembly and the other of the circumferential end edges of the wound sealing assembly, the main direction of the junction forming, with the circumferential direction of the support, a substantially constant initial angle over the whole of the axial width of the wound sealing assembly between the two axial edges of the wound sealing assembly;

there is formed, by winding a carcass ply or a plurality of carcass plies, radially outside the wound sealing assembly, one or more wound carcass assembly(ies), the wound carcass assembly(ies) being intended to form the carcass layer(s), there is formed, by winding a working ply or a plurality of working plies, radially outside the wound carcass assembly(ies), one or more wound working assembly(ies), the wound working assembly(ies) being intended to form the working layer(s), the wound sealing assembly, the wound carcass assembly(ies) and the wound working assembly(ies) forming an assembly of substantially cylindrical shape around the main axis of the support, the assembly of substantially cylindrical shape around the main axis of the support is deformed so as to obtain an assembly of substantially toric shape around the main axis of the support so that, after the deformation step, the main direction of the junction forms, with the circumferential direction of the support:

in a portion of the wound sealing assembly extending axially in radial line with the wound working assembly or the radially innermost wound working assembly and having an axial width equal to at least 40% of the axial width of the wound working assembly or the radially innermost wound working assembly, a final angle ranging, in absolute value, from 20° to 60°, in a portion of the wound sealing assembly intended to extend radially in each sidewall and having a radial height equal to at least 5% of the radial height of the manufactured tyre, a final angle, in absolute value, strictly greater than the final angle of the main direction of the junction in the portion of the wound sealing assembly extending axially in radial line with the wound working assembly or the radially innermost wound working assembly.

During the method, prior to the deformation step, the main direction is coincident with the curve of shortest length passing through:

a point located equidistant in the circumferential direction from each first point of each circumferential end edge located at one of the two axial ends of the wound sealing assembly, these two first points facing one another in the circumferential direction, a point located equidistant in the circumferential direction from each second point of each circumferential end edge located at the other of the two axial ends of the wound sealing assembly, these two second points facing one another in the circumferential direction, the second points being located on the other side of the median plane of the support with respect to the first points, and a point located equidistant in the circumferential direction from each third point located on the median plane of the support and on each circumferential end edge of the wound sealing assembly, these two third points facing one another in the circumferential direction.

During the method, subsequent to the deformation step, in the portion of the wound sealing assembly extending axially in radial line with the wound working assembly or the radially innermost wound working assembly, the main direction is coincident with the curve of shortest length passing through:

a point located equidistant in the circumferential direction from each first point of each circumferential end edge located at one of the two axial ends of the portion of the wound sealing assembly extending axially radially in line with the working assembly or the radially innermost working assembly, these two first points facing each other in the circumferential direction, and a point located equidistant in the circumferential direction from each second point of each circumferential end edge located at the other of the two axial ends of the portion of the wound sealing assembly extending axially in radial line with the working assembly or the radially innermost working assembly, these two second points facing each other in the circumferential direction, the second points being located on the other side of the median plane of the support with respect to the first points.

During the method, after the deformation step, in the portion of the sealing assembly intended to extend radially in each sidewall, the main direction is coincident with the curve of shortest length passing through:

a point located equidistant in the circumferential direction from each first point of each circumferential end edge located at one of the two axial ends of the portion of the sealing assembly intended to extend radially in each sidewall, these two first points facing each other in the circumferential direction, and a point located equidistant in the circumferential direction from each second point of each circumferential end edge located at the other of the two axial ends of the portion of the sealing assembly intended to extend radially in each sidewall, these two second points facing one another in the circumferential direction, the second points being located radially on the outside with respect to the first points.

In the first method according to the invention, the initial angles formed with the circumferential direction of the support by the main directions of the carcass and working filamentary reinforcing elements vary during the deformation step to reach their final angles, except for the wound portion of the carcass assembly wound around the circumferential reinforcing elements in which the main direction of the carcass filamentary reinforcing elements remains substantially identical with respect to the circumferential direction of the support and therefore of the tyre. The variation of the angle formed with the circumferential direction of the support by the main directions of the carcass filamentary reinforcing elements also causes a variation of the angle formed by the main direction of the junction with the circumferential direction of the support, this variation being different depending on whether one is in the portion of the wound sealing assembly extending axially in radial line with the wound working assembly or the radially innermost wound working assembly or whether one is in the portion of the wound sealing assembly intended to extend radially in each sidewall.

Specifically, on the one hand, the main direction of the junction will follow the variation in the angle of each carcass filamentary reinforcing element and therefore be radialized in each sidewall so that the final angle in the portion of the wound sealing assembly intended to extend radially in each sidewall will increase and thus make it possible to reduce the circumferential length of the junction. On the other hand, the main direction of the junction will follow the variation of the angle of each carcass filamentary reinforcing element in the portion of the wound sealing assembly extending axially in radial line with the wound working assembly or the radially innermost wound working assembly so that the final angle reached in this portion of the wound sealing assembly extending axially in radial line with the wound working assembly or the radially innermost wound working assembly makes it possible to obtain a noise reduction.

It will be noted that, thanks to this first method according to the invention, it is sufficient, during the step of forming the junction, to have a main direction of the junction forming, with the circumferential direction of the support, a substantially constant initial angle due to the different variation of the angle of the main direction of the junction during the deformation step.

The variation of the angle of the main direction of the junction can be determined by a person skilled in the art as a function of the rate of deformation used during the method. The rate of deformation is determined in a manner known to those skilled in the art as a function of the axial drawing together of the axial edges of the wound carcass assembly (ies) and of the radial enlargement of the assembly between its cylindrical shape and its toric shape. The determination of the initial angles as a function of the final angles depends, in a manner known to those skilled in the art, on the rate of deformation as explained in FR2797213 and in FR1413102.

According to the invention, the main direction of the junction has, between the portions, transition zones where the angle is substantially variable. The portion of the wound sealing assembly extending axially in line with the wound working assembly or the radially innermost wound working assembly and in which the main direction of the junction forms, with the circumferential direction of the tyre, an angle ranging, in absolute value, from 20° to 60° has an axial width equal to at least 40%, preferably at least 50%, of the axial width of the wound working assembly or the radially innermost wound working assembly.

In embodiments in which the main direction of the junction has, between the portions, transition zones where the angle is substantially variable, the portion of the wound sealing assembly extending axially in line with the wound working assembly or the radially innermost wound working assembly and in which the main direction of the junction forms, with the circumferential direction of the support, an angle ranging, in absolute value, from 20° to 60° has an axial width equal to at most 90%, preferably at most 80%, of the axial width of the wound working assembly or the radially innermost wound working assembly.

Preferably, the median plane of the assembly intersects that portion of the wound sealing assembly extending axially in radial line with the wound working assembly or the radially innermost wound working assembly. More preferably, that portion of the wound sealing assembly extending axially in radial line with the wound working assembly or the radially innermost wound working assembly is axially centred on the median plane of the assembly.

The axial width of the portion of the wound sealing assembly depends in particular on the rate of deformation as well as on the initial angle. Those skilled in the art will know, by varying one and/or the other of these parameters, how to vary the axial width of the portion of the wound sealing assembly concerned.

According to the invention, the main direction of the junction has, between the portions, transition zones where the angle is substantially variable. Each portion of the sealing assembly intended to extend radially in each sidewall and in which the main direction of the junction forms, with the circumferential direction of the support, a final angle strictly greater than the final angle of the main direction of the junction in the portion of the wound sealing assembly extending axially in radial line with the wound working assembly or the radially innermost wound working assembly, has a radial height equal to at least 5%, preferably at least 15% and more preferably at least 30%, of the radial height of the manufactured tyre.

In embodiments in which the main direction of the junction has, between the portions, transition zones where the angle is substantially variable, each portion of the sealing assembly intended to extend radially in each sidewall and in which the main direction of the junction forms, with the circumferential direction of the support, a final angle strictly greater than the final angle of the main direction of the junction in the portion of the wound sealing assembly extending axially in radial line with the wound working assembly or the radially innermost wound working assembly, has a radial height equal to at most 80%, preferably at most 70% and more preferably at most 60%, of the radial height of the manufactured tyre.

Preferably, the equatorial circumferential plane of the assembly intersects each portion of the sealing assembly intended to be located in each sidewall.

Similarly, the radial height of the portion of the wound sealing assembly depends in particular on the rate of deformation as well as on the initial angle. Those skilled in the art will know, by varying one and/or the other of these parameters, how to vary the radial height of each portion of the wound sealing assembly concerned.

By median plane of the assembly (denoted m) is meant the plane perpendicular to the main axis of the support which is located at mid-axial distance, between each axial edge of the assembly.

By equatorial circumferential plane of the assembly (denoted e) is meant the theoretical cylindrical surface passing through the equator of the assembly, perpendicular to the median plane and to the radial direction. The equator of the assembly is, in a meridian section plane (plane perpendicular to the circumferential direction and parallel to the radial and axial directions), the axis parallel to the main axis of the support and located equidistant between the radially outermost point of the assembly and the radially innermost point of the assembly, the distance between these two points being equal to h.

Advantageously, the main direction of the junction forms, with the circumferential direction of the support, a final angle, in absolute value, greater than or equal to 25°, preferably greater than or equal to 30°, in the portion of the wound sealing assembly extending axially in radial line with the wound working assembly or the radially innermost wound working assembly.

Advantageously, the main direction of the junction forms, with the circumferential direction of the support, a final angle, in absolute value, less than or equal to 50°, preferably less than or equal to 40°, in the portion of the wound sealing assembly extending axially in radial line with the wound working assembly or the radially innermost wound working assembly.

In order to obtain the final angles previously described by implementing methods exhibiting relatively moderate deformation rates, there will advantageously be had the initial angle formed by the main direction of the junction with the circumferential direction of the support ranging, in absolute value, from 35° to 80°.

Advantageously, the final angle formed by the main direction of the junction with the circumferential direction of the support ranges, in absolute value, from 80° to 90° in the portion of the wound sealing assembly intended to extend radially in each sidewall. Thus, the circumferential length of the junction is limited as much as possible by limiting the final angle in each portion of the sealing assembly intended to extend radially in each sidewall.

In one embodiment making it possible to retain the properties of a radial tyre conferred by the radial carcass filamentary reinforcing elements in the sidewalls and the properties of a tyre comprising a triangulated crown reinforcement, the or each wound carcass assembly being delimited axially by two axial edges of the or each wound carcass assembly and comprising carcass filamentary reinforcing elements extending substantially parallel to one another axially from one axial edge to the other axial edge of the or each wound carcass assembly, each carcass filamentary reinforcing element extending, in the or each carcass ply, in a main direction of each carcass filamentary reinforcing element in the or each carcass ply, the main direction of each carcass filamentary reinforcing element forming, with the circumferential direction of the support, an initial angle of each carcass filamentary reinforcing element, the assembly of substantially cylindrical shape is deformed so as to obtain the assembly of substantially toric shape so that the main direction of each carcass filamentary reinforcing element forms, with the circumferential direction of the support:

a final angle of each carcass filamentary reinforcing element, in absolute value, strictly less than 80°, in a portion of the or each wound carcass assembly extending axially in radial line with the wound working assembly or the radially innermost wound working assembly, a final angle of each carcass filamentary reinforcing element ranging, in absolute value, from 80° to 90°, in a portion of the or each wound carcass assembly intended to extend radially in each sidewall.

In embodiments in which the main direction of each carcass filamentary reinforcing element has, between the portions, transition zones where the angle is substantially variable, the portion of the or each wound carcass assembly extending axially in radial line with the wound working assembly or the radially innermost wound working assembly and in which the main direction of each carcass filamentary reinforcing element forms, with the circumferential direction of the support, a final angle, in absolute value, strictly less than 80°, has an axial width equal to at least 40%, preferably at least 50%, of the axial width of the wound working assembly or the radially innermost wound working assembly.

In embodiments in which the main direction of each carcass filamentary reinforcing element has, between the portions, transition zones where the angle is substantially variable, the portion of the or each wound carcass assembly extending axially in radial line with the wound working assembly or the radially innermost wound working assembly and in which the main direction of each carcass filamentary reinforcing element forms, with the circumferential direction of the support, a final angle, in absolute value, strictly less than 80°, has an axial width equal to at most 90%, preferably at most 80%, of the axial width of the wound working assembly or the radially innermost wound working assembly.

Preferably, the median plane of the assembly intersects that portion of the or each wound carcass assembly extending axially in radial line with the wound working assembly or the radially innermost wound working assembly. More preferably, that portion of the or each wound carcass assembly extending axially in radial line with the wound working assembly or the radially innermost wound working assembly is axially centred on the median plane of the assembly.

The axial width of the portion of the or each wound carcass assembly depends in particular on the rate of deformation as well as on the initial angles. Those skilled in the art will know, by varying one and/or the other of these parameters, how to vary the axial width of the portion of the or each wound carcass assembly concerned.

In embodiments in which the main direction of each carcass filamentary reinforcing element has, between the portions, transition zones where the angle is substantially variable, each portion of the or each wound carcass assembly intended to be extend radially in each sidewall and in which the main direction of each carcass filamentary reinforcing element forms, with the circumferential direction of the support, a final angle ranging, in absolute value, from 80° to 90°, has a radial height equal to at least 5%, preferably at least 15% and even more preferably at least 30%, of the radial height of the manufactured tyre.

In embodiments in which the main direction of each carcass filamentary reinforcing element has, between the portions, transition zones where the angle is substantially variable, each portion of the or each wound carcass assembly intended to extend radially in each sidewall and in which the main direction of each carcass filamentary reinforcing element forms, with the circumferential direction of the support, a final angle ranging, in absolute value, from 80° to 90°, has a radial height equal to at most 80%, preferably at most 70% and even more preferably at most 60%, of the radial height of the manufactured tyre.

Preferably, the equatorial circumferential plane of the assembly intersects each portion of the or each wound carcass assembly intended to be located in each sidewall.

Similarly, the radial height of the portion of the or each wound carcass assembly depends in particular on the rate of deformation as well as on the initial angles. Those skilled in the art will know, by varying one and/or the other of these parameters, how to vary the radial height of each portion of the or of each wound carcass assembly concerned.

In order to obtain, at the end of the deformation step, final angles allowing a preferential compromise of performance of the tyre, the initial angle formed by the main direction of each carcass filamentary reinforcing element with the circumferential direction of the support is, in absolute value, strictly greater than 0°, preferably ranges from 27° to 150° and more preferably ranges from 56° to 123°.

Such a preferential compromise in performance of the tyre is obtained when the final angle formed by the main direction of each carcass filamentary reinforcing element with the circumferential direction of the support is, in absolute value, greater than or equal to 10°, preferably ranges from 20° to 75° and more preferably ranges from 35 to 70°, in the portion of the or each wound carcass assembly extending axially in radial line with the wound working assembly or the radially innermost wound working assembly.

In one embodiment making it possible to preserve the properties of a tyre comprising a triangulated crown reinforcement, the or each wound working assembly being delimited axially by two axial edges of the or each wound working assembly and comprising working filamentary reinforcing elements extending substantially parallel to one another axially from one axial edge to the other axial edge of the or each wound working assembly, each working filamentary reinforcing element extending, in the or each working ply, in a main direction of each working filamentary reinforcing element in the or each working ply, the main direction of each working filamentary reinforcing element in the or each working ply forming, with the circumferential direction of the support, an initial angle of each working filamentary reinforcing element, the assembly of substantially cylindrical shape is deformed so as to obtain the assembly of substantially toric shape so that the main direction of each working filamentary reinforcing element forms, with the circumferential direction of the support, a final angle of each working filamentary reinforcing element, in absolute value, strictly greater than 10°, preferably ranging from 15° to 50° and more preferably from 18° to 30°.

In order to obtain, at the end of the deformation step, final angles allowing a preferential compromise in performance of the tyre, the initial angle formed by the main direction of each working filamentary reinforcing element with the circumferential direction of the support is, in absolute value, strictly greater than 0°, preferably ranges from 4° to 60° and more preferably ranges from 16° to 47°.

In some embodiments, the final angle formed by the main direction of each working filamentary reinforcing element with the circumferential direction of the support is substantially equal to the angle formed by the main direction of each working filamentary reinforcing element of the working layer(s) with the circumferential direction of the tyre once the latter has been manufactured. Similarly, in these same embodiments, the final angle formed by the main direction of each carcass filamentary reinforcing element with the circumferential direction of the support in the portion of the wound carcass assembly extending axially in radial line with the wound working assembly or the radially innermost wound working assembly is substantially equal to the angle formed by the main direction of each carcass filamentary reinforcing element of the carcass layer(s) with the circumferential direction of the tyre in the portion of the carcass layer(s) extending axially in radial line with the working layer or the radially innermost working layer once the tyre has been manufactured.

In other embodiments, a slight decrease in the final angles may occur during the step of moulding the green blank in a mould during which the green blank is pressed against moulding surfaces of the mould and undergoes non-negligible radial moulding deformation relative to the deformation undergone during the deformation step to change the assembly of the wound carcass assembly and the wound working assembly from the substantially cylindrical shape to the substantially toric shape.

A very preferred embodiment provides that one arranges, radially on the outside of the wound working assembly(ies), a wound hooping assembly intended to form a hoop reinforcement, the wound hooping assembly being formed by helical winding of at least one hooping filamentary reinforcing element or of a hooping ply obtained by embedding one or more hooping filamentary reinforcing elements in an elastomeric matrix, so as to extend axially from one axial edge to the other axial edge of the wound hooping assembly.

Advantageously, the or each hooping filamentary reinforcing element extending in a main direction of the or each hooping filamentary reinforcing element, the angle formed by the main direction of the or each hooping filamentary reinforcing element with the circumferential direction of the support is, in absolute value, less than or equal to 10°, preferably less than or equal to 7° and more preferably less than or equal to 5°.

In preferred embodiments making it possible to obtain effective triangulation, the main direction of the or each hooping filamentary reinforcing element, the main direction of each working filamentary reinforcing element and the main direction of each carcass filamentary reinforcing element form, with the circumferential direction of the support, in a portion of the assembly and of the wound hooping assembly lying axially between the axial edges of the axially narrowest wound assembly among the wound working assembly, the radially innermost wound working assembly and the wound hooping assembly, paired angles different in absolute value.

The portion of the assembly and the wound hooping assembly lying axially between the axial edges of the axially narrowest wound assembly among the wound working assembly, the radially innermost wound working assembly and the wound hooping assembly and in which the main direction of the or each hooping filamentary reinforcing element, the main direction of each working filamentary reinforcing element and the main direction of each carcass filamentary reinforcing element form, with the circumferential direction of the support, paired angles different in absolute value, has an axial width equal to at least 40%, preferably at least 50%, of the axial width of the wound working assembly or the radially innermost wound working assembly.

The portion of the assembly and the wound hooping assembly lying axially between the axial edges of the axially narrowest wound assembly among the wound working assembly, the radially innermost wound working assembly and the wound hooping assembly and in which the main direction of the or each hooping filamentary reinforcing element, the main direction of each working filamentary reinforcing element and the main direction of each carcass filamentary reinforcing element form, with the circumferential direction of the support, paired angles different in absolute value, has an axial width equal to at most 90%, preferably at most 80%, of the axial width of the wound working assembly or the radially innermost wound working assembly.

Preferably, the median plane of the assembly intersects this portion of the assembly and of the wound hooping assembly lying axially between the axial edges of the axially narrowest wound assembly among the wound working assembly, the radially innermost wound working assembly and the wound hooping assembly. More preferably, this portion of the assembly and of the wound hooping assembly lying axially between the axial edges of the axially narrowest wound assembly among the wound working assembly, the radially innermost wound working assembly and the wound hooping assembly is axially centred on the median plane of the assembly.

Second Method According to the Invention

Another subject of the invention is a second method making it possible to manufacture a tyre as described above and in which there is formed, by winding a sealing ply or a plurality of sealing plies around a support having a substantially cylindrical shape around a main axis, a wound sealing assembly intended to form the sealing layer, the wound sealing assembly comprising a junction between two circumferential end edges of the wound sealing assembly, the junction forming a radial overlap between one of the circumferential end edges of the wound sealing assembly and the other of the circumferential end edges of the wound sealing assembly, there is formed, by winding a carcass ply or a plurality of carcass plies, radially outside the wound sealing assembly, one or more wound carcass assembly(ies), the wound carcass assembly(ies) being intended to form the carcass layer(s), the wound sealing assembly and the wound carcass assembly(ies) forming an assembly of substantially cylindrical shape around the main axis of the support, the assembly of substantially cylindrical shape around the main axis of the support is deformed so as to obtain an assembly of substantially toric shape around the main axis of the support, then, after the step of deforming the assembly, there is formed, by winding a working ply or a plurality of working plies, radially outside the wound carcass assembly(ies), one or more wound assembly(ies) intended to form the working layer(s), in which method:

during the step of forming the wound sealing assembly, the junction is formed so that the main direction of the junction forms, with the circumferential direction of the support:

in a portion of the wound sealing assembly intended to extend axially in radial line with the wound working assembly or the radially innermost wound working assembly, an initial angle, in absolute value, strictly less than 80°, in a portion of the wound sealing assembly intended to extend radially in each sidewall, an initial angle, in absolute value, strictly greater than the initial angle of the main direction of the junction in the portion of the wound sealing assembly intended to extend axially in radial line with the wound working assembly or the radially innermost wound working assembly, and the assembly of substantially cylindrical shape is deformed so as to obtain the assembly of substantially toric shape so that, after the deformation step, the main direction of the junction forms, with the circumferential direction of the support:

in the portion of the wound sealing assembly intended to extend axially in radial line with the wound working assembly or the radially innermost wound working assembly and having an axial width equal to at least 70% of the axial width of the wound working assembly or the radially innermost wound working assembly, a final angle, in absolute value, ranging from 20° to 60°, in the portion of the wound sealing assembly intended to extend radially in each sidewall and having a radial height equal to at least 60% of the radial height of the manufactured tyre, a final angle, in absolute value, strictly greater than the final angle of the main direction of the junction in the portion of the wound sealing assembly intended to extend axially in radial line with the wound working assembly or the radially innermost wound working assembly.

Unlike the first method according to the invention, the second method of the invention does not make it possible to benefit from the radialization of the main direction of the junction in the portion of the sealing assembly intended to extend radially in each sidewall. It is therefore necessary to form, from the step of forming the wound sealing assembly, a junction whose main direction has different angles depending on whether one is in the portion of the wound sealing assembly intended to extend axially in radial line with the wound working assembly or the radially innermost wound working assembly or whether one is in the portion of the wound sealing assembly intended to extend radially in each sidewall.

During the method, in the portion of the wound sealing assembly intended to extend axially in radial line with the wound working assembly or the radially innermost wound working assembly, the main direction is coincident with the curve of shortest length passing through:
- a point located equidistant in the circumferential direction from each first point of each circumferential end edge located at one of the two axial ends of the portion of the wound sealing assembly intended to extend axially in radial line with the working assembly or the radially innermost working assembly, these two first points facing each other in the circumferential direction, and
- a point located equidistant in the circumferential direction from each second point of each circumferential end edge located at the other of the two axial ends of the wound sealing assembly intended to extend axially in radial line with the working assembly or the radially innermost working assembly, these two second points facing each other in the circumferential direction, the second points being located on the other side of the median plane of the support with respect to the first points.

During the method, in the portion of the sealing assembly intended to extend radially in each sidewall, the main direction is coincident with the curve of shortest length passing through:
- a point located equidistant in the circumferential direction from each first point of each circumferential end edge located at one of the two axial ends of the portion of the sealing assembly intended to extend radially in each sidewall, these two first points facing each other in the circumferential direction, and
- a point located equidistant in the circumferential direction from each second point of each circumferential end edge located at the other of the two axial ends of the portion of the sealing assembly intended to extend radially in each sidewall, these two second points facing one another in the circumferential direction, the second points being located radially on the outside with respect to the first points.

Thus, in the second embodiment, provision is made for the angle of the main direction of the junction to be, prior to the deformation step, not constant. Thus, this angle is differentiated prior to the deformation step so that, at the end of the deformation step, this differentiation is preserved, thus making it possible to obtain the best compromise between the noise emitted and the circumferential length of the junction.

In embodiments in which the main direction of the junction has relatively short or even non-existent transition zones, the portion of the wound sealing assembly intended to extend axially in line with the wound working assembly or the radially innermost wound working assembly and in which the main direction of the junction forms, with the circumferential direction of the tyre, an initial angle, in absolute value, strictly less than 80°, has an axial width equal to at least 70%, preferably at least 80%, of the axial width of the wound working assembly or the radially innermost wound working assembly.

According to the invention, the main direction of the junction has relatively short or even non-existent transition zones. The portion of the wound sealing assembly intended to extend axially in line with the wound working assembly or the radially innermost wound working assembly and in which the main direction of the junction forms, with the circumferential direction of the tyre, a final angle ranging, in absolute value, from 20° to 60° has an axial width equal to at least 70%, preferably at least 80%, of the axial width of the wound working assembly or the radially innermost wound working assembly.

Preferably, the median plane of the assembly intersects that portion of the wound sealing assembly intended to extend axially in radial line with the wound working assembly or the radially innermost wound working assembly. More preferably, that portion of the wound sealing assembly extending axially in radial line with the wound working assembly or the radially innermost wound working assembly is axially centred on the median plane of the assembly.

In embodiments in which the main direction of the junction has relatively short or even non-existent transition zones, each portion of the wound sealing assembly intended to extend radially in each sidewall and in which the main direction of the junction forms, with the circumferential direction of the support, an initial angle strictly greater than the initial angle of the main direction of the junction in the portion of the wound sealing assembly extending axially in radial line with the wound working assembly or the radially innermost wound working assembly has a radial height equal to at least 60%, preferably at least 70%, of the radial height of the manufactured tyre.

According to the invention, the main direction of the junction has relatively short or even non-existent transition zones. Each portion of the wound sealing assembly intended to extend radially in each sidewall and in which the main direction of the junction forms, with the circumferential direction of the support, a final angle strictly greater than the final angle of the main direction of the junction in the portion of the wound sealing assembly extending axially in radial line with the wound working assembly or the radially innermost wound working assembly, has a radial height equal to at least 60%, preferably at least 70%, of the radial height of the manufactured tyre.

Preferably, the equatorial circumferential plane of the assembly intersects each portion of the sealing assembly intended to be located in each sidewall.

In one embodiment making it easy to achieve the desired final angle in the portion of the wound sealing assembly intended to extend axially in radial line with the wound working assembly or the radially innermost wound working assembly, the initial angle formed by the main direction of the junction with the circumferential direction of the support ranges, in absolute value, from 23° to 75°, in the portion of the wound sealing assembly intended to extend axially in radial line with the wound working assembly or the radially innermost wound working assembly. Those skilled in the art will know how to determine the initial angle as a function of the final angle which they wish to achieve as a function of the degree of shaping used during the method.

Advantageously, after the deformation step, the main direction of the junction forms, with the circumferential direction of the tyre, a final angle, in absolute value, greater than or equal to 25°, preferably greater than or equal to 30°, in the portion of the sealing assembly intended to extend axially in radial line with the working assembly or the radially innermost working assembly.

Advantageously, after the deformation step, the main direction of the junction forms, with the circumferential direction of the tyre, a final angle, in absolute value, less than or equal to 50°, preferably less than or equal to 40°, in the portion of the sealing assembly intended to extend axially in radial line with the working assembly or of the radially innermost working assembly.

In one embodiment making it possible to reduce the circumferential length of the junction as much as possible, the initial angle formed by the main direction of the junction with the circumferential direction of the support ranges, in absolute value, from 80° to 90° in the portion of the wound sealing assembly intended to extend radially in each sidewall.

In one embodiment making it possible to reduce the circumferential length of the junction as much as possible, the final angle formed by the main direction of the junction with the circumferential direction of the support ranges, in absolute value, from 80° to 90° in the portion of the wound sealing assembly intended to extend radially in each sidewall.

In one embodiment making it possible to obtain the properties of a radial tyre conferred by radial carcass filamentary reinforcing elements in the sidewalls, the or each wound carcass assembly being delimited axially by two axial edges of the or each wound carcass assembly and comprising carcass filamentary reinforcing elements extending substantially parallel to one another axially from one axial edge to the other axial edge of the or each wound carcass assembly, each carcass filamentary reinforcing element extending, in the or each carcass ply, in a main direction of each carcass filamentary reinforcing element in the or each carcass ply, the main direction of each carcass filamentary reinforcing element in the or each carcass ply forming, with the circumferential direction of the support, an initial angle of each carcass filamentary reinforcing element ranging, in absolute value, from 80° to 90°, the assembly of substantially cylindrical shape is deformed so as to obtain the assembly of substantially toric shape so that the main direction of each carcass filamentary reinforcing element forms, with the circumferential direction of the support, a final angle of each carcass filamentary reinforcing element ranging, in absolute value, from 80° to 90° over the whole of the or each wound carcass assembly between the two axial edges of the or each wound carcass assembly.

In one embodiment making it possible to obtain the properties of a tyre comprising a triangulated crown reinforcement, the or each wound working assembly being delimited axially by two axial edges of the or each wound working assembly and comprising working filamentary reinforcing elements extending substantially parallel to one another axially from one axial edge to the other axial edge of the or each wound working assembly, each working filamentary reinforcing element extending, in the or each working ply, in a main direction of each working filamentary reinforcing element in the or each working ply, the main direction of each working filamentary reinforcing element in the or each working ply forms, with the circumferential direction of the support, an angle of each working filamentary reinforcing element, in absolute value, strictly greater than 10°, preferably ranging from 15° to 50° and more preferably from 18° to 30°.

In one embodiment of the first or of the second method according to the invention, comprising, after the deformation step, a step of crosslinking a green blank formed from the assembly, in a crosslinking mould comprising a deformable membrane intended to apply pressure to a radially internal surface of the wound sealing assembly, in which method, after the deformation step and prior to the crosslinking step, the following are coated with an anti-adhesive composition:
    a radially and axially external surface of the deformable membrane intended to come into contact with the radially internal surface of the wound sealing assembly during the crosslinking step, or
    the radially internal surface of the wound sealing assembly intended to come into contact with a radially and axially external surface of the deformable membrane during the crosslinking step.

Preferably, the adhesive composition comprises a silicone. Such compositions exhibit excellent anti-adhesive properties. Silicones are also called polysiloxanes.

As in the first method according to the invention, a very preferred embodiment provides that one arranges, radially outside the wound working assembly(ies), a wound hooping assembly intended for forming a hoop reinforcement, the wound hooping assembly being formed by helical winding of at least one hooping filamentary reinforcing element or of a hooping ply obtained by embedding one or more hooping filamentary reinforcing elements in an elastomeric matrix, so as to extend axially from one axial edge to the other axial edge of the wound hooping assembly.

Advantageously, the or each hooping filamentary reinforcing element extending in a main direction of the or each hooping filamentary reinforcing element, the angle formed by the main direction of the or each hooping filamentary reinforcing element with the circumferential direction of the support is, in absolute value, less than or equal to 10°, preferably less than or equal to 7° and more preferably less than or equal to 5°.

In preferred embodiments making it possible to obtain effective triangulation, the main direction of the or each hooping filamentary reinforcing element, the main direction of each working filamentary reinforcing element and the main direction of each carcass filamentary reinforcing element form, with the circumferential direction of the support, in a portion of the assembly and of the wound hooping assembly lying axially between the axial edges of the axially narrowest wound assembly among the wound working assembly, the radially innermost wound working assembly and the wound hooping assembly, paired angles different in absolute value except for the angles of the working filamentary reinforcing elements of each working assembly when the method uses two working assemblies. In this case, the angles of the working filamentary reinforcing elements of each working assembly have the same absolute value and are of opposite orientations.

Whether in the first or the second method according to the invention, a carcass assembly may be intended to form a single carcass layer or else be intended to form two carcass layers by winding this carcass assembly over two turns around the sealing assembly. Thus, in one embodiment in which the tyre comprises two carcass layers, it is possible to form a single carcass assembly wound over two turns around the sealing assembly or else to form a first radially internal carcass assembly wound around the sealing assembly and a second radially external carcass assembly wound around the first radially internal carcass assembly, each first and second carcass assembly forming each carcass layer.

Similarly, a working assembly may be intended to form a single working layer or else be intended to form two working layers by winding this working assembly over two turns around the carcass assembly(ies). Thus, in one embodiment in which the tyre comprises two working layers, it is possible to form a single working assembly wound over two turns around the carcass assembly or else to form a first radially internal working assembly wound around the carcass assembly and a second radially external working assembly wound around the first radially internal working assembly, each first and second working assembly forming each working layer.

Whether in the first or the second method according to the invention, in a simplified method in which only one carcass ply has to be handled to form each wound carcass assembly and in which circumferential junctions would be avoided between a plurality of carcass plies of axial widths less than the axial width of each wound carcass assembly intended to be formed, each wound carcass assembly consists of a carcass ply which is intended to form each carcass layer. In other words, each carcass ply is axially continuous.

In the case where the wound carcass assembly is formed with a plurality of carcass plies, preferably a plurality of carcass plies will be used in which the main directions of the carcass filamentary reinforcing elements are all parallel to one another.

Similarly, in a simplified method in which only one working ply has to be handled to form each wound working assembly and in which circumferential junctions would be avoided between a plurality of working plies of axial widths less than the axial width of each wound working assembly intended to be formed, each wound working assembly consists of a working ply which is intended to form each working layer. In other words, each working ply is axially continuous.

In the case where the wound working assembly is formed with a plurality of working plies, preferably a plurality of working plies will be used in which the main directions of the working filamentary reinforcing elements are all parallel to one another. Of course, main directions of the working filamentary reinforcing elements that are not parallel to one another from one working ply to the other may be envisaged.

In one embodiment making it possible to easily anchor the carcass reinforcement in each bead, after the step of forming the or at least one of the wound carcass assembly(ies):

two circumferential reinforcing elements are arranged around the or at least one of the wound carcass assembly(ies), each axial edge of the or at least one of the wound carcass assembly(ies) is turned axially inwardly so as to radially cover each circumferential reinforcing element by one of the axial edges of the or at least one of the wound carcass assembly(ies) and to form a portion of the or at least one of the wound carcass assembly(ies) wound around each circumferential reinforcing element, the assembly of substantially cylindrical shape is deformed so as to obtain the assembly of substantially toric shape so that the main direction of each carcass filamentary reinforcing element forms, with the circumferential direction of the support, a final angle of each carcass filamentary reinforcing element:

in absolute value, strictly less than 80° in the wound portion of the or at least one of the wound carcass assembly(ies) in the first method according to the invention, and in absolute value, ranging from 80° to 90° in the wound portion of the or at least one of the wound carcass assembly(ies) in the second method according to the invention.

In the first method according to the invention, the final angle formed by the main direction of each carcass filamentary reinforcing element, with the circumferential direction of the support, in the wound portion of the or at least one of the wound carcass assembly(ies), is substantially identical to the initial angle formed by the main direction of each carcass filamentary reinforcing element before the deformation step due to the anchoring of this portion around the circumferential reinforcing element.

BRIEF DESCRIPTION OF THE FIGURES

The invention as well as its advantages will be easily understood in the light of the detailed description and the non-limiting exemplary embodiments which follow, as well as from FIGS. 1 to 28 relating to these examples, in which:

FIGS. 5 to 19 illustrate the different steps of the first method according to the invention making it possible to manufacture the tyre of FIG. 1;

In the figures relating to the tyre, there is shown a reference frame X, Y, Z corresponding to the usual axial (X), radial (Y) and circumferential (Z) directions, respectively, of a tyre. In the figures relating to the method, there is shown a reference frame x, y, z corresponding to the usual axial (x), radial (y) and circumferential (z) directions, respectively, of a manufacturing support deformable between a substantially cylindrical shape and a toric shape around the x axis.

Figure 1:
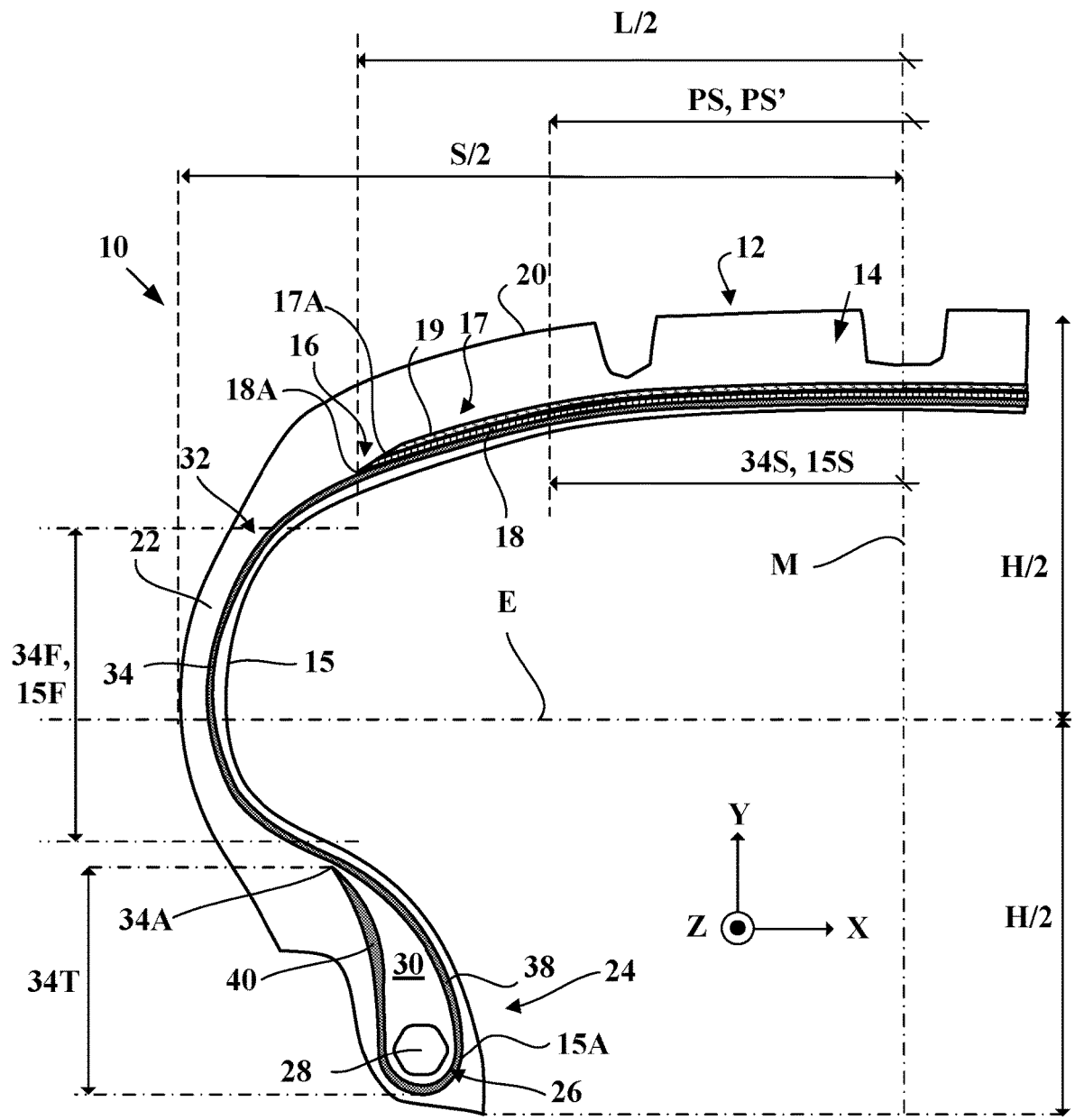
FIG. 1 is a view in section in a meridian section plane of a tyre according to a first embodiment of the invention.

FIG. 1 shows a tyre according to the invention and denoted by the general reference 10. The tyre 10 is substantially of revolution about an axis substantially parallel to the axial direction X. The tyre 10 is here intended for a passenger vehicle and has dimensions 245/45R18.

The tyre 10 comprises a crown 12 comprising a tread 20 intended to come into contact with the ground when rolling and a crown reinforcement 14 extending in the crown 12 in the circumferential direction Z. The tyre 10 also comprises a sealing layer 15 for sealing against an inflation gas, being intended to delimit an internal cavity closed with a mounting support for the tyre 10 once the tyre 10 has been mounted on the mounting support, for example a rim. The sealing layer 15 comprises an elastomeric composition comprising an elastomeric matrix comprising at least 50 phr of one or more butyl elastomers.

The crown reinforcement 14 comprises a working reinforcement 16 comprising a working layer 18 and a hoop reinforcement 17 comprising a single hooping layer 19. Here, the working reinforcement 16 comprises a single working layer 18 and is, in this case, made up of the single working layer 18. In this first embodiment, mention will be made, for the sake of simplification, of the working layer 18 without restating each time that this layer is single The hoop reinforcement 17 consists of the hooping layer 19.

The crown reinforcement 14 is surmounted radially by the tread 20. Here, the hoop reinforcement 17, here the hooping layer 19, is arranged radially outside the working reinforcement 16 and is therefore radially interposed between the working reinforcement 16 and the tread 20. In the embodiment illustrated in FIG. 2, the hoop reinforcement 17 has an axial width smaller than the axial width of the working layer 18. Thus, the hoop reinforcement is axially the narrowest of the working layer 18 and of the hoop reinforcement 17.

The tyre 10 comprises two sidewalls 22 extending the crown 12 radially inwards. The tyre 10 further comprises two beads 24 radially to the inside of the sidewalls 22. Each sidewall 22 connects each bead 24 to the crown 12.

Each bead 24 comprises at least one circumferential reinforcing element 26, in this case a bead wire 28 surmounted radially by a mass of filling rubber 30.

The tyre 10 comprises a carcass reinforcement 32 anchored in each bead 24. The carcass reinforcement 32 extends in each sidewall 22 and radially inwardly at the crown 12. The crown reinforcement 14 is arranged radially between the tread 20 and the carcass reinforcement 32.

The carcass reinforcement 32 comprises a carcass layer 34. Here, the carcass reinforcement 32 comprises a single carcass layer 34, and in this case consists of the single carcass layer 34. In this first embodiment, mention will be made, for the sake of simplification, of the carcass layer 34 without restating each time that this layer is single.

The carcass layer 34 comprises a portion 34T of the carcass layer 34 wound around each circumferential reinforcing element 26 so as to form in each bead 24 an axially inner portion 38 and an axially outer portion 40. The mass of filling rubber 30 is interposed between the axially inner and outer portions 38, 40. Other methods of anchoring the carcass layer 34 are possible, for example as described in U.S. Pat. No. 5,702,548.

Each working layer 18, hooping layer 19 and carcass layer 34 comprises an elastomeric matrix in which there are embedded one or more filamentary reinforcing elements of the corresponding layer. These layers will now be described with reference to FIGS. 1 to 4.

The hoop reinforcement 17, here the hooping layer 19, is delimited axially by two axial edges 17A, 17B of the hoop reinforcement 17. The hoop reinforcement 17 comprises a plurality of hooping filamentary reinforcing elements 170 wound circumferentially helically so as to extend axially from the axial edge 17A to the other axial edge 17B of the hooping layer 17 in a main direction D1 of each hooping filamentary reinforcing element 170. The main direction D1 forms, with the circumferential direction Z of the tyre 10, an angle AF, in absolute value, less than or equal to 10°, preferably less than or equal to 7° and more preferably less than or equal to 5°. Here, AF=−5°.

The working layer 18 is delimited axially by two axial edges 18A, 18B of the working layer 18. The working layer 18 comprises working filamentary reinforcing elements 180 extending axially from the axial edge 18A to the other axial edge 18B of the working layer 18 substantially parallel to one another. Each working filamentary reinforcing element 180 extends in a main direction D2 of each working filamentary reinforcing element 180. The direction D2 forms, with the circumferential direction Z of the tyre 10, an angle AT, in absolute value, strictly greater than 10°, preferably ranging from 15° to 50° and more preferably ranging from 18° to 30°. Here, AT=24°.

The carcass layer 34 is delimited axially by two axial edges 34A, 34B of the carcass layer 34. The carcass layer 34 comprises carcass filamentary reinforcing elements 340 extending axially from the axial edge 34A to the other axial edge 34B of the carcass layer 34.

Each carcass filamentary reinforcing element 340 extends in a main direction D3 of each carcass filamentary reinforcing element 340 forming, with the circumferential direction Z of the tyre 10, an angle ACS, in absolute value, strictly less than 80° in a portion 34S of the carcass layer 34 extending axially in radial line with the working layer 18. Advantageously, in this portion 34S of the carcass layer 34 extending axially in radial line with the working layer 18, the main direction D3 of each carcass filamentary reinforcing element 340 forms, with the circumferential direction Z of the tyre 10, an angle ACS, in absolute value, greater than or equal to 10°, preferably ranging from 20° to 75° and more preferably ranging from 35° to 70°. Here, ACS=43°.

The portion 34S of the carcass layer 34 extending axially in line with the working layer 18 has an axial width equal to at least 40%, preferably at least 50%, of the axial width L of the working layer 18 and equal to at most 90%, preferably at most 80%, of the axial width L of the working layer 18 and in this case equal to 60% of the working layer 18. The median plane M of the tyre 10 intersects this portion 34S. More preferably, this portion 34S is axially centred on the median plane M of the tyre 10.

Figure 3:
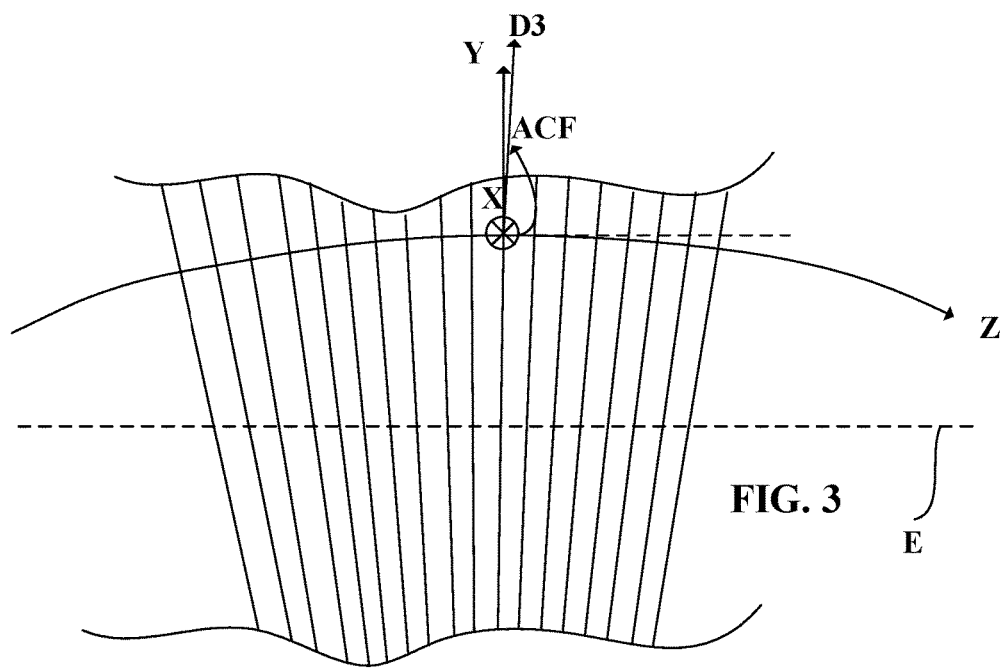
FIG. 3 is a schematic view of the carcass filamentary reinforcing elements arranged in the sidewall of the tyre of FIG. 1.

As illustrated in FIGS. 1 and 3, the main direction D3 of each carcass filamentary reinforcing element 340 forms, with the circumferential direction Z of the tyre 10, an angle ACF, in absolute value, ranging from 80° to 90° in at least one portion 34F of the carcass layer 34 extending radially in each sidewall 22. Here, ACF=90°.

Each portion 34F of the carcass layer 34 extending radially in each sidewall 22 has a radial height equal to at least 5%, preferably at least 15% and more preferably at least 30%, of the radial height H of the tyre 10 and equal to at most 80%, preferably at most 70% and more preferably at most 60%, of the radial height H of the tyre 10 and in this case equal to 41% of the radial height H of the tyre 10. The equatorial circumferential plane E of the tyre 10 intersects each portion 34F of the carcass layer 34 located in each sidewall 22.

The main direction D3 of each carcass filamentary reinforcing element 340 forms, with the circumferential direction Z of the tyre 10, an angle ACT, in absolute value, strictly greater than 0°, preferably ranging from 27° to 150° and more preferably ranging from 56° to 123°, in the wound portion 34T of the carcass layer 34.

Figure 2:
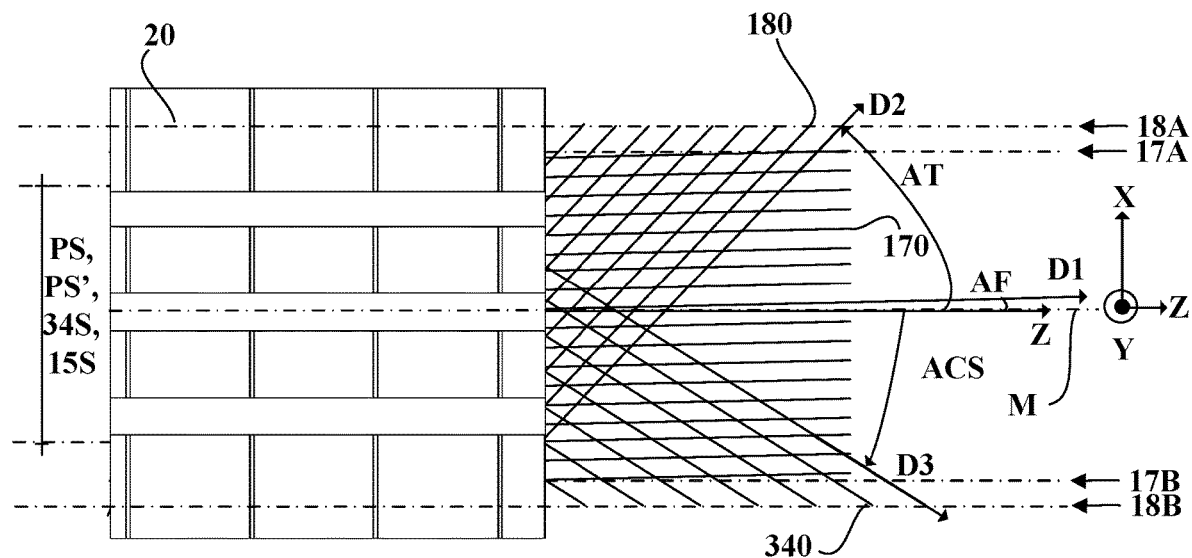
FIG. 2 is a schematic cutaway view of the tyre of FIG. 1 illustrating the arrangement of the filamentary reinforcing elements in radial line with and radially overhanging the working layer.

As illustrated in FIG. 2, the main direction D1 of each hooping filamentary reinforcing element 170, the main direction D2 of each working filamentary reinforcing element 180 and the main direction D3 of each carcass filamentary reinforcing element 340 form, with the circumferential direction Z of the tyre 10, in a portion PS' of the tyre 10 lying axially between the axial edges 17A, 17B of the hoop reinforcement 17, paired angles which are different in absolute value. In addition, the main direction D2 of each working filamentary reinforcing element 180 and the main direction D3 of each carcass filamentary reinforcing element 340 form, with the circumferential direction Z of the tyre 10, in a portion PS of the tyre 10 lying axially between the axial edges 18A, 18B of the working layer 18, angles AT and ACS of opposite orientations. In this case, AT=−24° and ACS=+43°.

In the embodiment described, each portion PS, PS' of the tyre 10 has an axial width equal to at least 40%, preferably at least 50%, of the axial width L of the working layer 18 and equal to at most 90%, preferably at most 80%, of the axial width L of the working layer 18 and in this case equal to 60% of the axial width L of the working layer 18. The median plane M of the tyre 10 intersects each portion PS, PS' of the tyre 10. More preferably, each portion PS, PS' of the tyre 10 is axially centred on the median plane M of the tyre 10.

Each working reinforcing filamentary element 180 is an assembly of two steel monofilaments that each have a diameter equal to 0.30 mm, the two steel monofilaments being wound together at a pitch of 14 mm.

Each carcass filamentary reinforcing element 340 conventionally comprises two multifilament strands, each multifilament strand consisting of a monofilament yarn of polyesters, here of PET, these two multifilament strands being individually over-twisted at 240 turns per meter in one direction and then twisted together at 240 turns per meter in the opposite direction. These two multifilament strands are wound in a helix around one another. Each of these multifilament strands has a count equal to 220 tex.

Each hooping filamentary reinforcing element 170 is formed for example by a cord as described in WO2016166056, WO2016166057, WO2019122620, WO2016091809, WO2016091810, WO2016091811 or WO2016091812.

Figure 4:
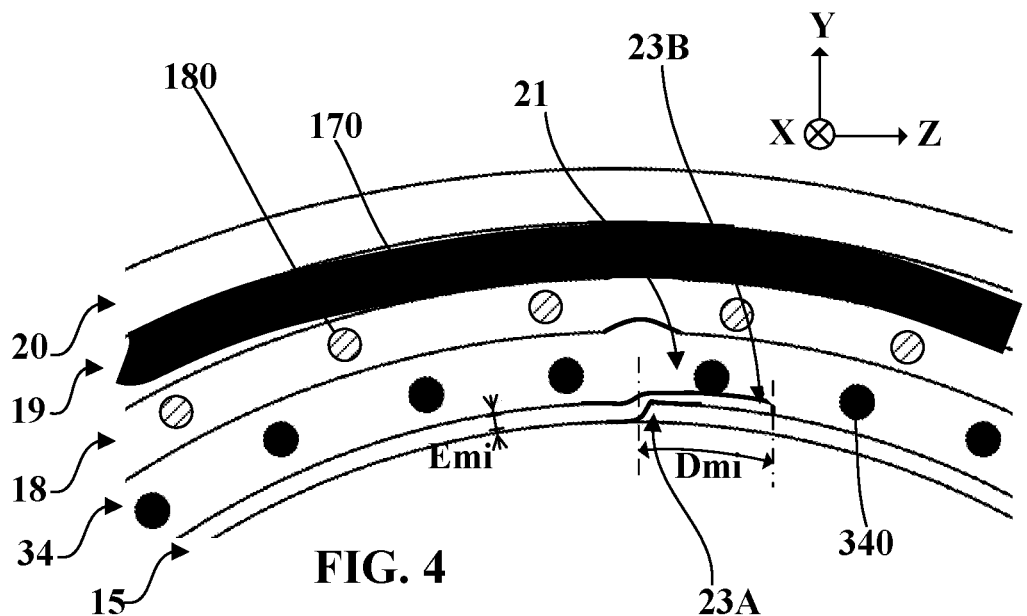
FIG. 4 is a view in a section plane perpendicular to the axial direction of a portion of the crown of the tyre of FIG. 1.
Figure 5:
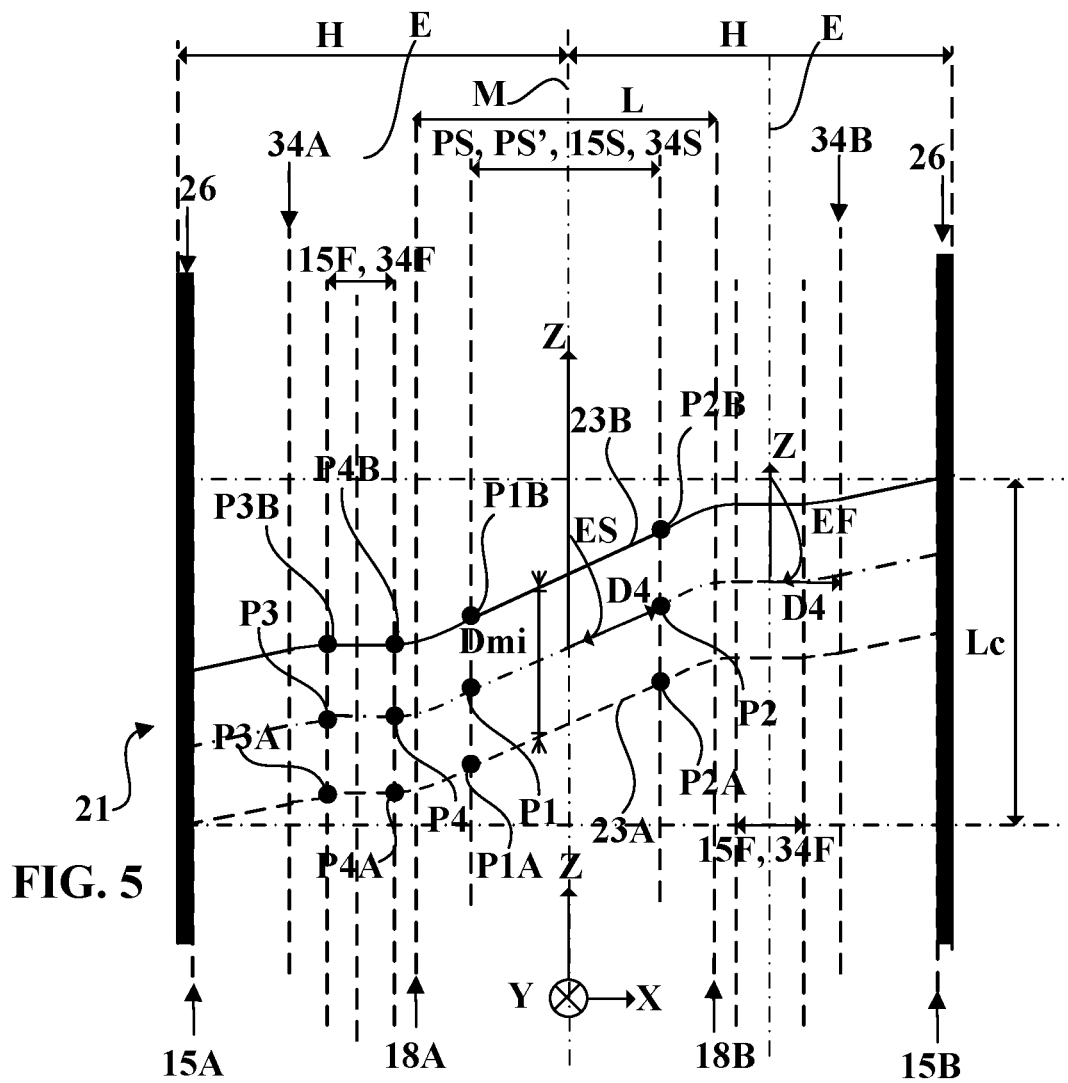
FIG. 5 is a schematic view of the tyre of FIG. 1.

Referring to FIGS. 1, 4 and 5, the sealing layer 15 is axially delimited by two axial edges 15A, 15B of the sealing layer 15. The average thickness Em of the sealing layer 15 ranges from 0.4 to 1.6 mm, preferably from 0.9 to 1.4 mm, in a portion 15S of the sealing layer 15 extending axially in radial line with the working layer 18 and here over the entire axial width of the sealing layer 15 between the axial edges 15A, 15B. In FIG. 4, one of the measurements Emi has been illustrated making it possible to determine Em as described above. In this case, Em=0.6 mm.

The sealing layer 15 comprises a junction 21 between two circumferential end edges 23A, 23B of the sealing layer 15. The junction 21 forms a radial overlap 25 between the circumferential end edge 23A and the other circumferential end edge 23B. The average distance Dm between each circumferential end edge 23A, 23B ranges from 1 to 15 mm, preferably from 2 to 8 mm, in the portion 15S of the sealing layer 15 and here over the entire axial width of the sealing layer 15 between the axial edges 15A, 15B. In FIG. 4, one of the measurements Dmi has been illustrated making it possible to determine Dm as described above. In this case, Dm=2 mm.

Referring to FIG. 5, the junction 21 extends in a main direction D4 forming, with the circumferential direction Z of the tyre 10, an angle ES ranging, in absolute value, from 20° to 60°, in the portion 15S of the sealing layer extending axially in radial line with the working layer 18. More precisely, in the portion 15S, the angle ES is, in absolute value, greater than or equal to 25°, preferably greater than or equal to 30° and less than or equal to 50°, preferably less than or equal to 40°. In this case, ES=37°.

As illustrated in FIG. 5, the main direction D4 is coincident with the curve of shortest length (FIG. 5 being schematic, it is a straight line), passing through:
- a point P1 located equidistant in the circumferential direction Z from each first point P1A, P1B of each circumferential end edge 23A, 23B located at one of the two axial ends of the portion 15S of the sealing layer 15, these two first points P1A, P1B facing each other in the circumferential direction Z, and
- a point P2 located equidistant in the circumferential direction Z from each second point P2A, P2B of each circumferential end edge 23A, 23B located at the other of the two axial ends of the portion 15S of the sealing layer 15, these two second points P2A, P2B facing each other in the circumferential direction Z.

The second points P2A, P2B are located on the other side of the median plane M of the tyre 10 with respect to the first points P1A, P1B.

The portion 15S of the sealing layer 15 extending axially in line with the working layer 18 has an axial width equal to at least 40%, preferably at least 50%, of the axial width L of the working layer 18 and equal to at most 90%, preferably at most 80%, of the axial width L of the working layer 18 and in this case equal to 60% of the working layer 18. The median plane M of the tyre 10 intersects this portion 15S. More preferably, this portion 15S is axially centred on the median plane M of the tyre 10.

The main direction D4 forms, with the circumferential direction Z of the tyre 10, an angle EF ranging, in absolute value, from 80° to 90°, in a portion 15F of the sealing layer 15 extending radially in each sidewall 22. In this case, EF=90°.

In the portion 15S of the sealing layer 15 extending radially in each sidewall 22, the main direction D4 is coincident with the curve of shortest length (FIG. 5 being schematic, it is a straight line), passing through:
- a point P3 located equidistant in the circumferential direction Z from each first point P3A, P3B of each circumferential end edge 23A, 23B located at one of the two axial ends of the portion 15S of the sealing layer 15 extending radially in each sidewall 22, these two first points P3A, P3B facing each other in the circumferential direction Z, and
- a point P4 located equidistant in the circumferential direction Z from each second point P4A, P4B of each circumferential end edge 23A, 23B located at the other of the two axial ends of the portion 15S of the sealing layer 15 extending radially in each sidewall 22, these two second points P4A, P4B facing each other in the circumferential direction Z.

The second points P4A, P4B are located radially on the outside with respect to the first points P3A, P3B.

Each portion 15F of the sealing layer 15 extending radially in each sidewall 22 has a radial height equal to at least 5%, preferably at least 15% and more preferably at least 30%, of the radial height H of the tyre 10 and equal to at most 80%, preferably at most 70% and more preferably at most 60%, of the radial height H of the tyre 10 and in this case equal to 41% of the radial height H of the tyre 10. The equatorial circumferential plane E of the tyre 10 intersects each portion 15F of the sealing layer 15 located in each sidewall 22.

According to the invention, the angle EF is, in absolute value, strictly greater than the angle ES. In FIG. 5, there is also illustrated the circumferential length Lc of the junction 21 corresponding to the circumferential distance separating the circumferentially most distant points between the two circumferential end edges 23A, 23B.

The carcass layer 34 includes a junction (not shown) between two circumferential end edges of the carcass layer 34. The junction forms, analogously to the sealing layer 15, a radial overlap between one of the circumferential end edges of the carcass layer 34 and the other of the circumferential end edges of the carcass layer 34. Any point of the junction of the sealing layer 15 is located at an azimuth offset by at least 60° and at most 300° with respect to any point of the junction of the carcass layer 34, in this case offset by at least 150° and at most 210°.

The tyre 10 is obtained by a first method according to the invention which will be described with reference to FIGS. 6 to 19.

First, a wound working assembly 50 and a wound carcass assembly 52 are manufactured by arranging the filamentary reinforcing elements 180 and 340 of each assembly 50 and 52 parallel to one another and embedding them, for example by calendering, in an uncrosslinked composition comprising at least one elastomer, the composition being intended to form an elastomeric matrix once crosslinked. A ply known as a straight ply is obtained, in which the filamentary reinforcing elements are parallel to one another and are parallel to the main direction of the ply. Then, portions of each straight ply are cut at a cutting angle and these portions are butted against one another so as to obtain a ply known as an angled ply, in which the filamentary reinforcing elements of the ply are parallel to one another and form an angle with the main direction of the ply equal to the cutting angle.

In the embodiment described, one obtains, on the one hand, a single working ply 49 and a single carcass ply 51, the axial width of each of which, that is to say the dimension in a direction perpendicular to the longitudinal edges of each ply, is equal to the axial width respectively of each wound working assembly 50 and carcass assembly 52 which will be formed subsequently.

Figure 6:
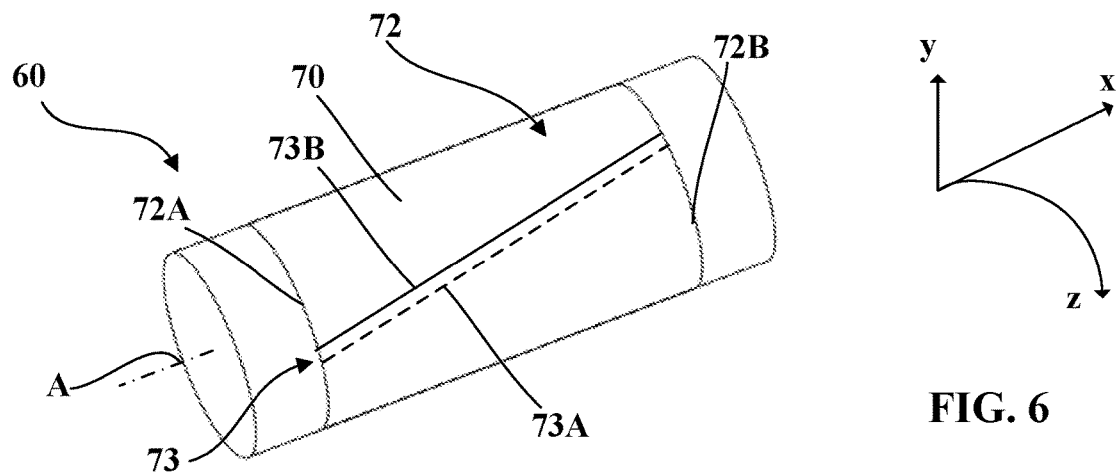
Figure 7:
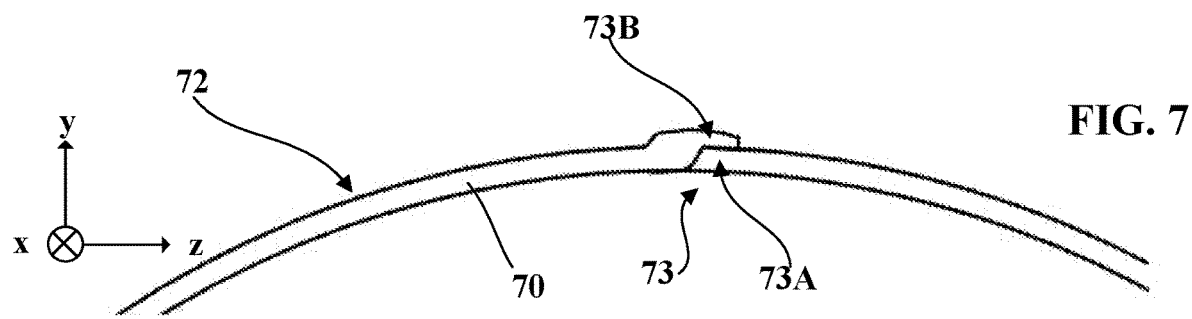

Referring to FIGS. 6 and 7, in a first step of assembling a green blank, there is formed, by winding a sealing ply 70 around a support 60 having a substantially cylindrical shape around its main axis A, a wound sealing assembly 72 intended to form the sealing layer 15. The support 60 has a substantially cylindrical laying surface with a radius equal to 235 mm. The wound sealing assembly 72 is axially delimited by two axial edges 72A, 72B of the wound sealing assembly 72. Each axial edge 72A, 72B of the wound sealing assembly 72 is intended to form each axial edge 15A, 15B of the sealing layer 15. The wound sealing assembly 72 includes a junction 73 between two circumferential end edges 73A, 73B of the wound sealing assembly 72. The junction 73, intended to form the junction 21 once the tyre has been manufactured, forms a radial overlap between the circumferential end edge 73A and the other circumferential end edge 73B.

Figure 8:
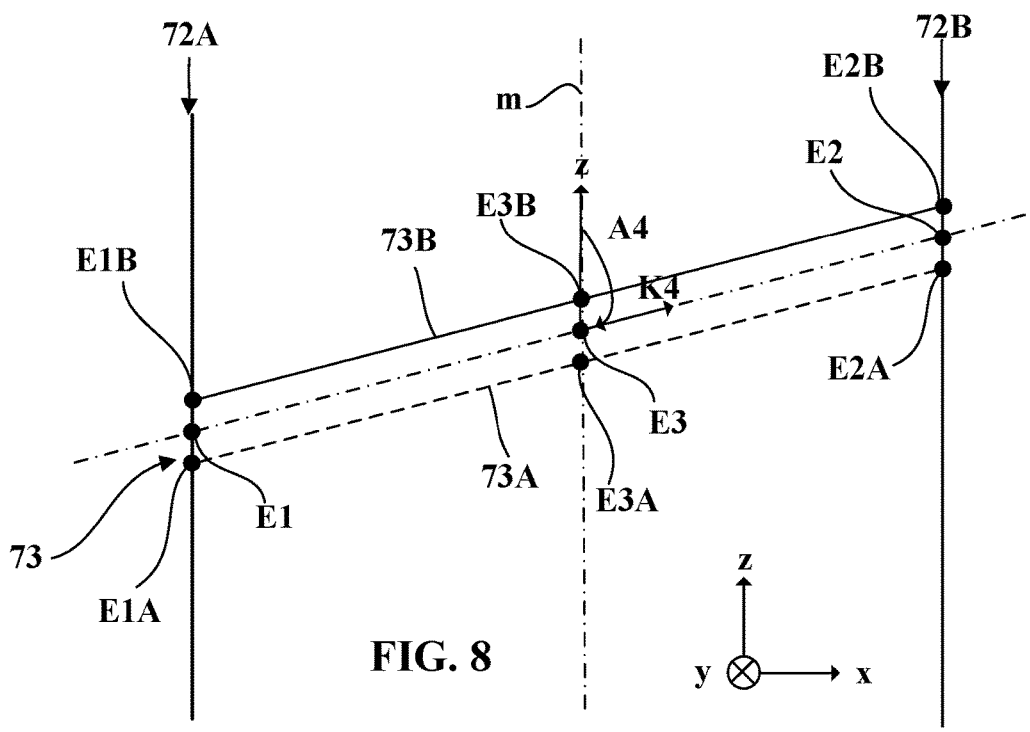

Referring to FIG. 8 schematically illustrating the sealing assembly 72, the main direction K4 of the junction 73 forms, with the circumferential direction z of the support 60, an initial angle A4 substantially constant over the whole of the axial width of the wound sealing assembly 72 between the two axial edges 72A, 72B of the wound sealing assembly 72. Each circumferential end edge 73A, 73B is intended to form each circumferential end edge 23A, 23B once the tyre has been manufactured. The main direction K4 is coincident with the curve of shortest length (FIG. 8 being schematic, it is a straight line), passing through:
- a point E1 located equidistant in the circumferential direction z from each first axial end point E1A, E1A of each circumferential end edge 73A, 73B of the wound sealing assembly 72, these two first points E1A, E1B facing each other in the circumferential direction z,
- a point E2 located equidistant in the circumferential direction z from each second axial end point E2A, E2B of each circumferential end edge 73A, 73B of the wound sealing assembly 72, these two second points E2A, E2B facing each other in the circumferential direction z, and
- a point E3 located equidistant in the circumferential direction z from each third point E3A, E3B located on the median plane m of the support 60 and on each circumferential end edge 73A, 73B of the wound sealing assembly 72, these two third points E3A, E3B facing each other in the circumferential direction z.

The second points E2A, E2B are located on the other side of the median plane m of the support 60 with respect to the first points E1A, E1B.

The initial angle A4 ranges, in absolute value, from 35° to 80° and is here equal to 73°.

Figure 9:
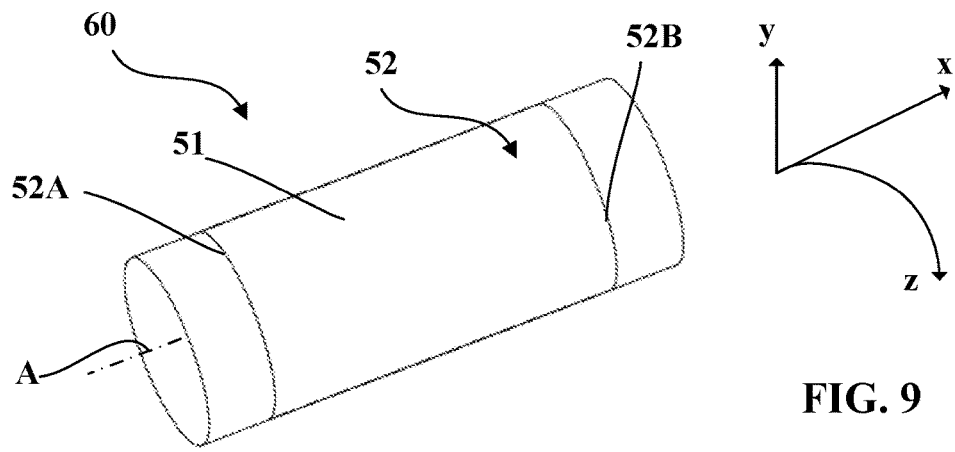
Figure 10:
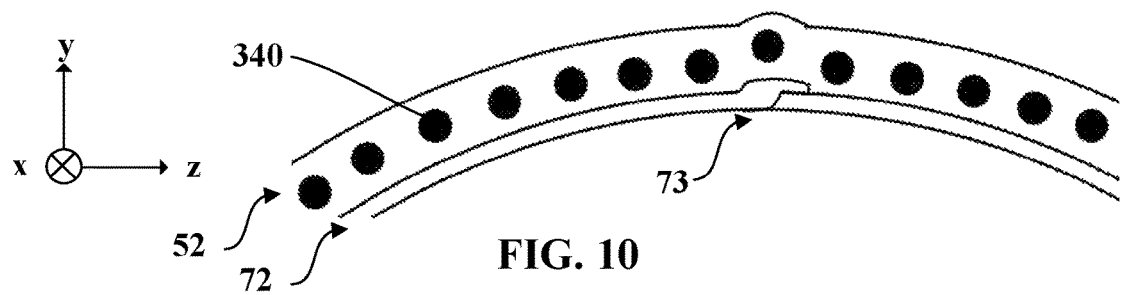

Then, with reference to FIGS. 9 and 10, radially outside the wound sealing assembly 72, there is formed, by winding the carcass ply 51 around the support 60, the wound carcass assembly 52 intended to form the carcass layer 34. The wound carcass assembly 52 is axially delimited by two axial edges 52A, 52B of the carcass assembly 52 and includes the carcass filamentary reinforcing elements 340 extending substantially parallel to one another axially from the axial edge 52A to the other axial edge 52B of the wound carcass assembly 52. Each carcass filamentary reinforcing element 340 extends, in the carcass ply 51, in a main direction K3 of each carcass filamentary reinforcing element 340 in the carcass ply 51. The main direction K3 forms, with the circumferential direction z of the support 60, an initial angle A3 of each carcass filamentary reinforcing element 340, in absolute value, strictly greater than 0°, preferably ranging from 27° to 150° and more preferably ranging from 56° to 123°. Here A3=75°.

Figure 11:
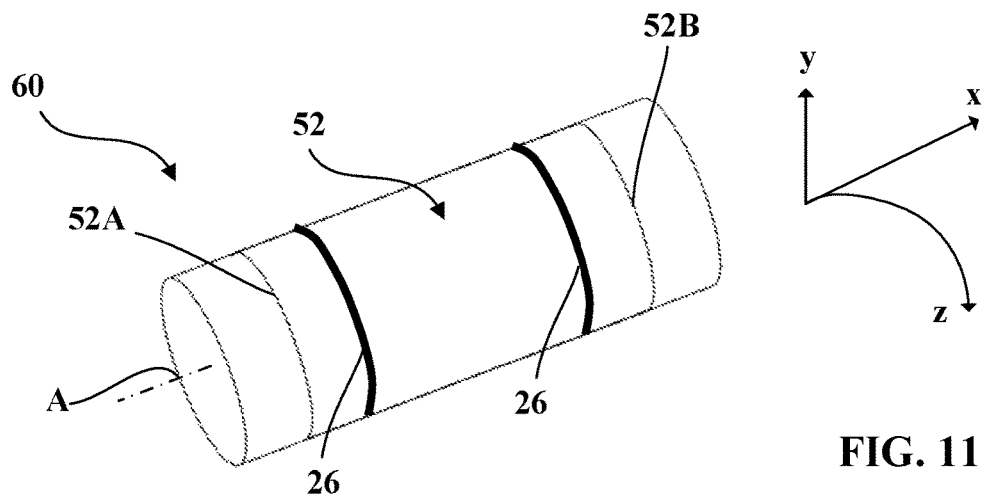
Figure 12:
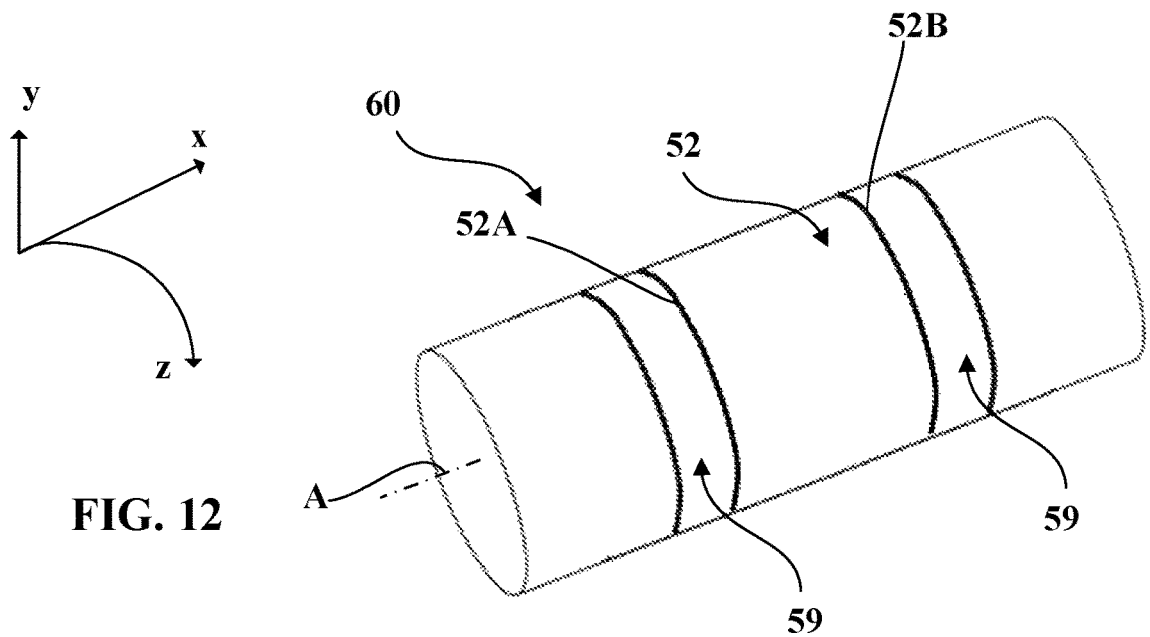

With reference to FIGS. 11 and 12, then, the two circumferential reinforcing elements 26 are arranged around the wound carcass assembly 52 and each axial edge 52A, 52B of the wound carcass assembly 52 is turned axially inward so as to radially cover each circumferential reinforcing element 26 by each axial edge 52A, 52B of the wound carcass assembly 52 and to form a portion 59 of the wound carcass assembly 52 wound around each circumferential reinforcing element 26. The portion 59 of the wound carcass assembly 52 is intended to form the portion 34T of the carcass layer 34 wound around each circumferential reinforcing element 26 in the tyre.

Figure 13:
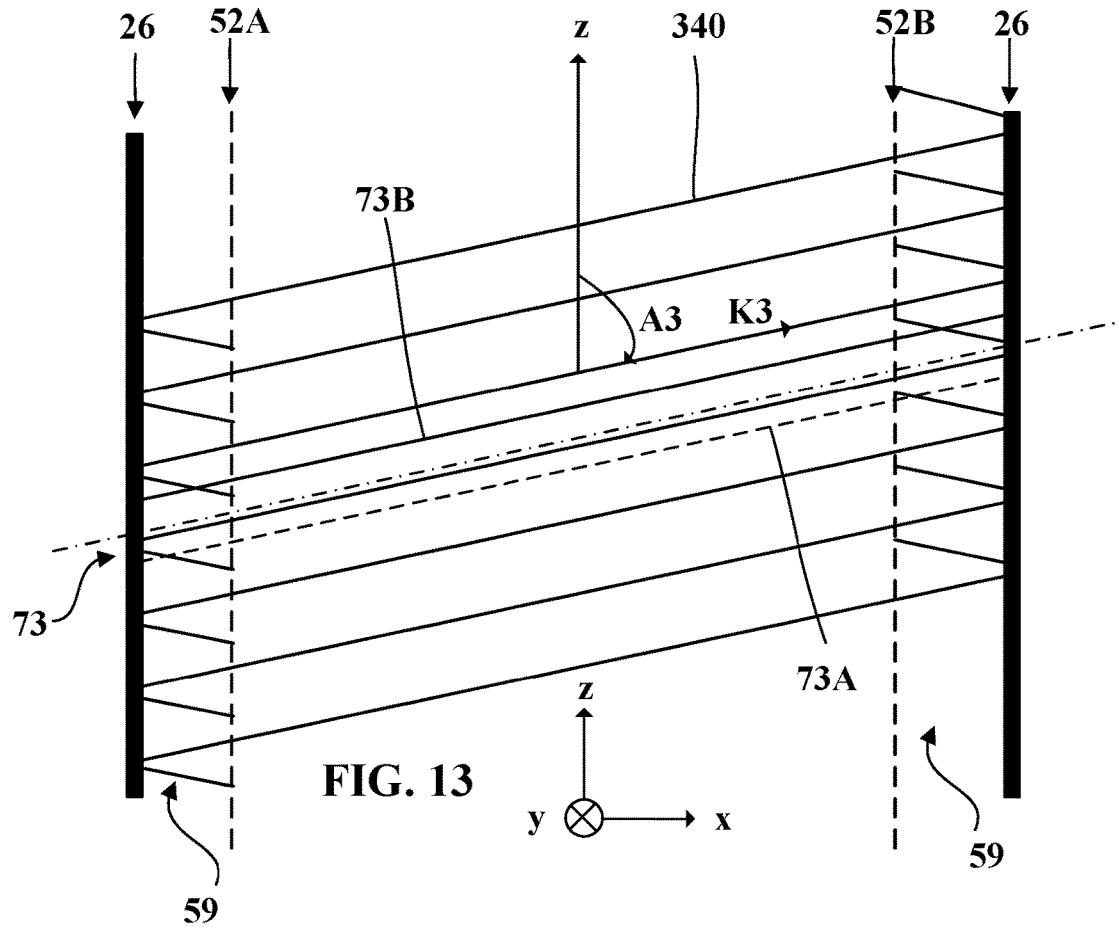

There is shown in FIG. 13 a diagram illustrating the arrangement of the carcass filamentary reinforcing elements 340 at the end of the step of axially turning the axial edges 52A, 52B of the wound carcass assembly 52 around the circumferential reinforcing elements 26. In this FIG. 13, there is shown the initial angle A3 described above as well as each portion 59.

Figure 14:
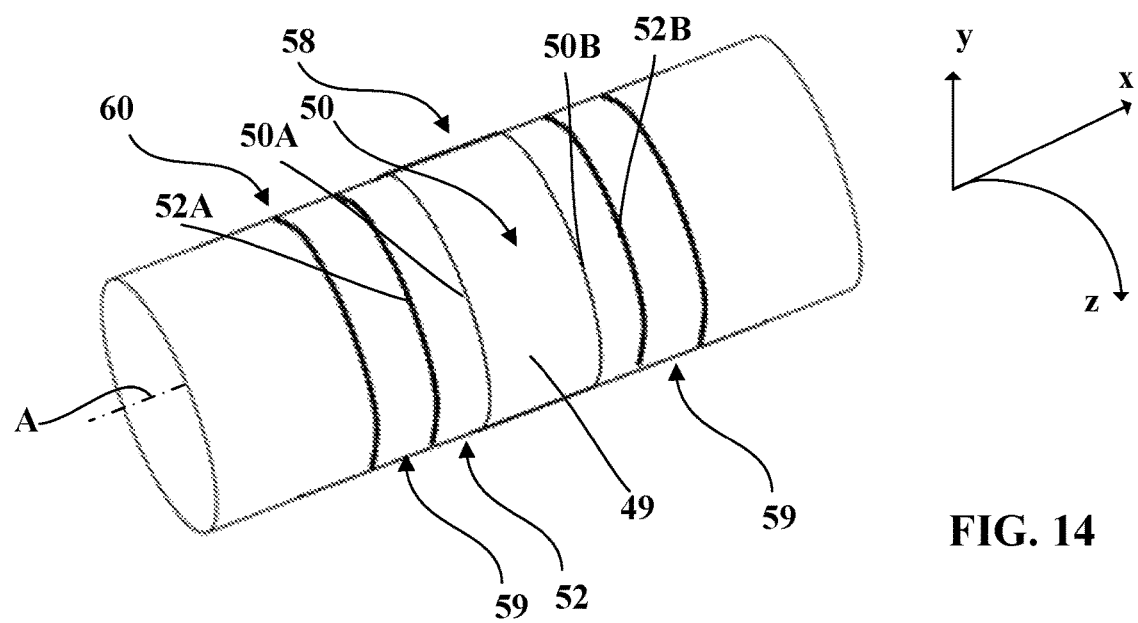
Figure 15:
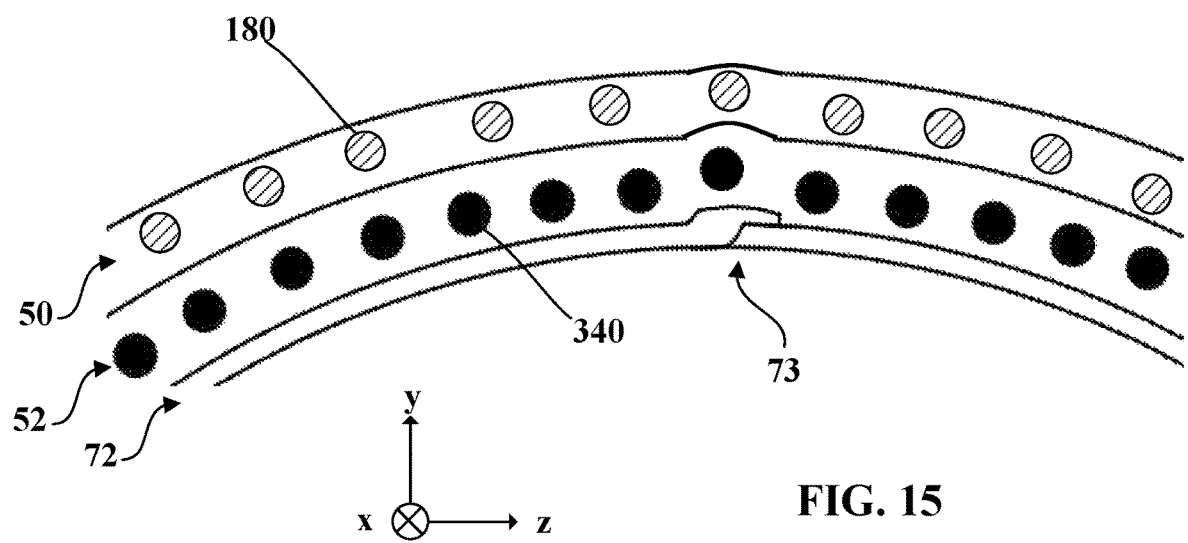
Figure 16:
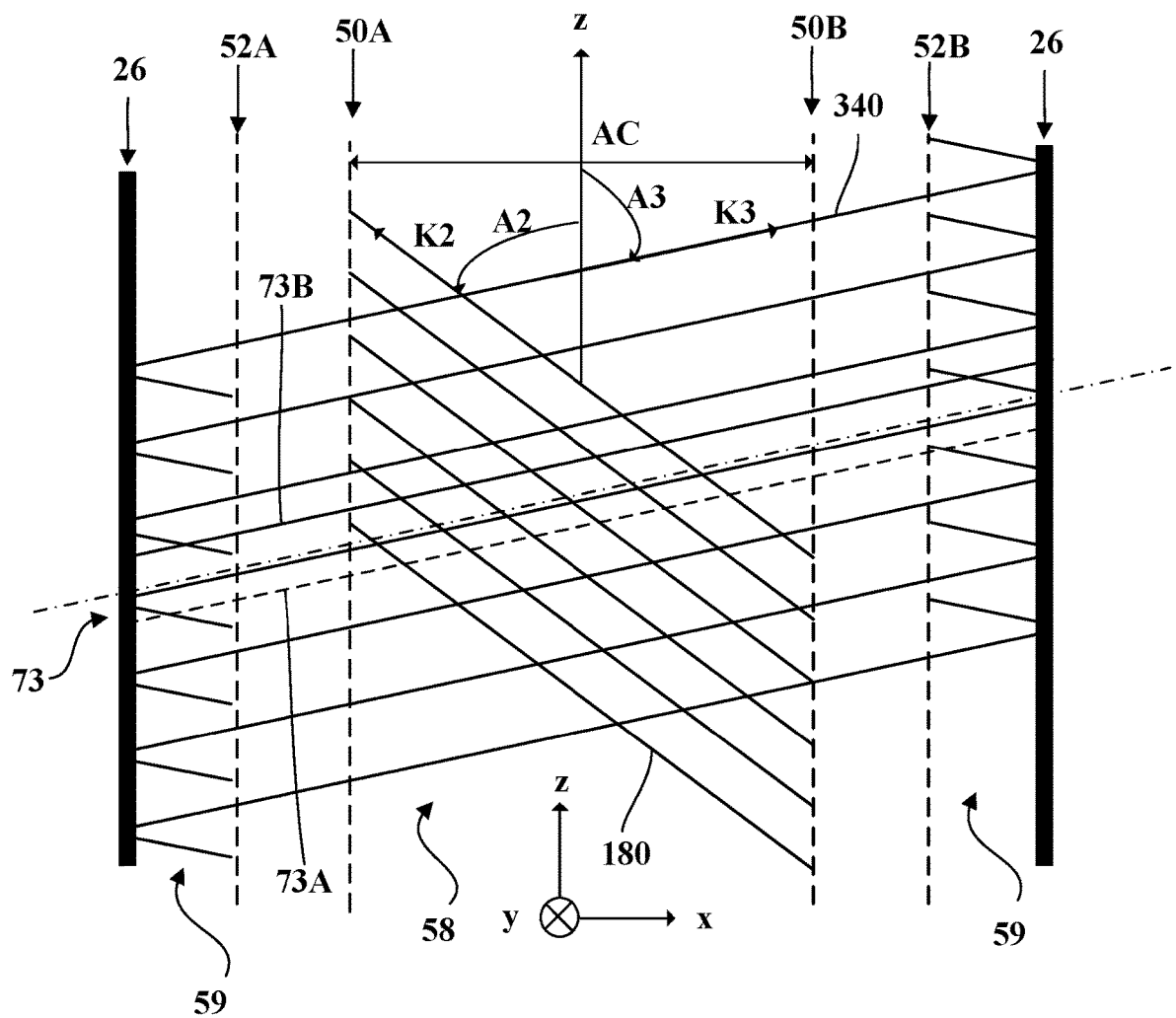

Then, with reference to FIGS. 14 and 15, there is formed, by winding the working ply 49, radially outside the wound carcass assembly 52, the wound working assembly 50 intended to form the working layer 18. The wound working assembly 50 is axially delimited by two axial edges 50A, 50B of the wound working assembly 50 and comprises the working filamentary reinforcing elements 180 extending substantially parallel to one another axially from the axial edge 50A to the other axial edge 50B of the wound working assembly 50. Each working filamentary reinforcing element 180 extends, in the working ply 49, in a main direction K2 of each working filamentary reinforcing element 180 in the working ply 49. With reference to FIG. 16, the main direction K2 forms, with the circumferential direction z of the support 60, an initial angle A2 of each working filamentary reinforcing element 180, in absolute value, strictly greater than 0°, preferably ranging from 4° to 60° and more preferably ranging from 16° to 47°. Here, A2=35°.

The wound sealing assembly 72, the wound carcass assembly 52 and the wound working assembly 50 then form an assembly 58 of substantially cylindrical shape around the main axis A of the support 60.

There is shown in FIG. 16 a diagram similar to that of FIG. 13 illustrating the arrangement of the carcass filamentary reinforcing elements 340 and the working filamentary reinforcing elements 180 at the end of the step of forming the wound working assembly 50. In this FIG. 16, the initial angles A2 and A3 have been shown.

The main direction K2 of each working filamentary reinforcing element 180 and the main direction K3 of each carcass filamentary reinforcing element 340 form, with the circumferential direction z of the support 60, in a portion AC of the assembly 58 lying axially between the axial edges 50A, 50B of the wound working assembly 50, initial angles A2 and A3 of opposite orientations. In this case, A2=−35° and A3=+75°.

Figure 17:
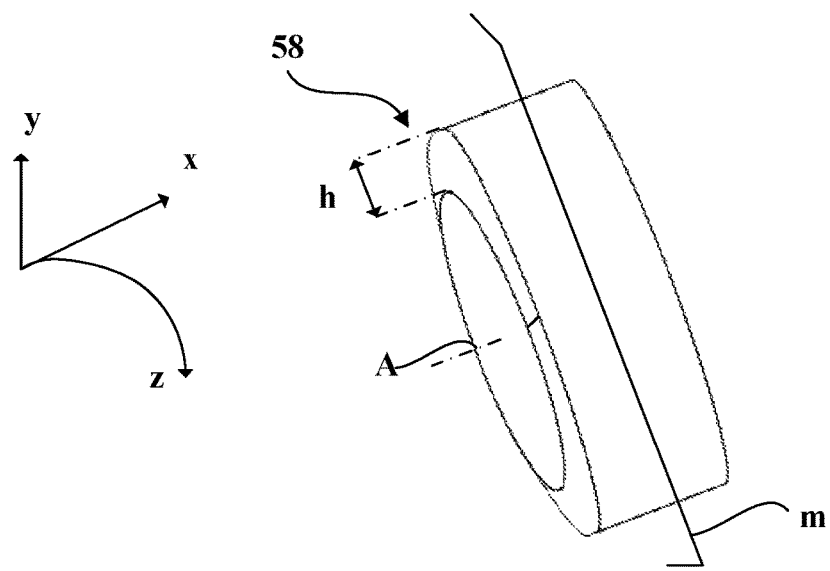
Figure 18:
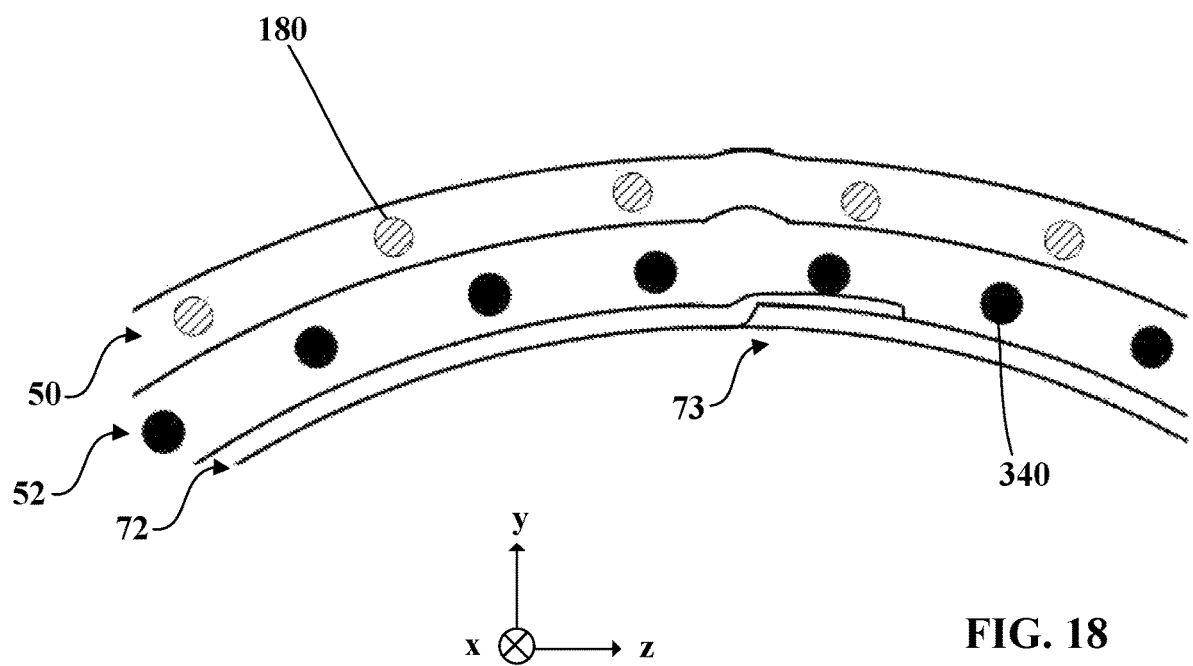

Then, the assembly 58 of substantially cylindrical shape around the main axis A of the support 60 is deformed so as to obtain the assembly 58 of substantially toric shape around the main axis A of the support 60. The deformed assembly 58 illustrated in FIGS. 17 and 18 is obtained. The laying surface of the support 60 then has, at the level of the median plane of the support, a radius equal to 327 mm.

Figure 19:
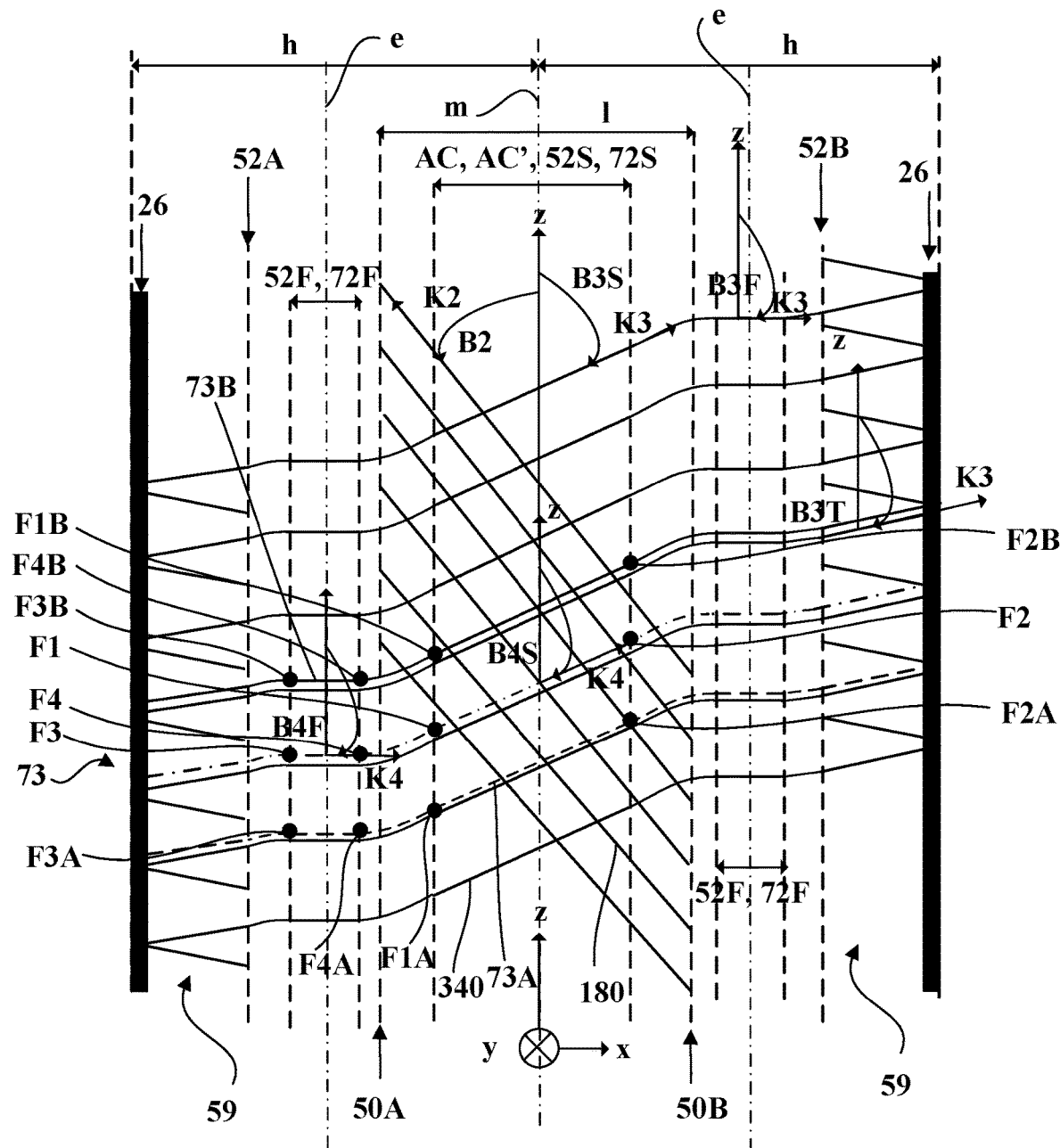
Figure 20:
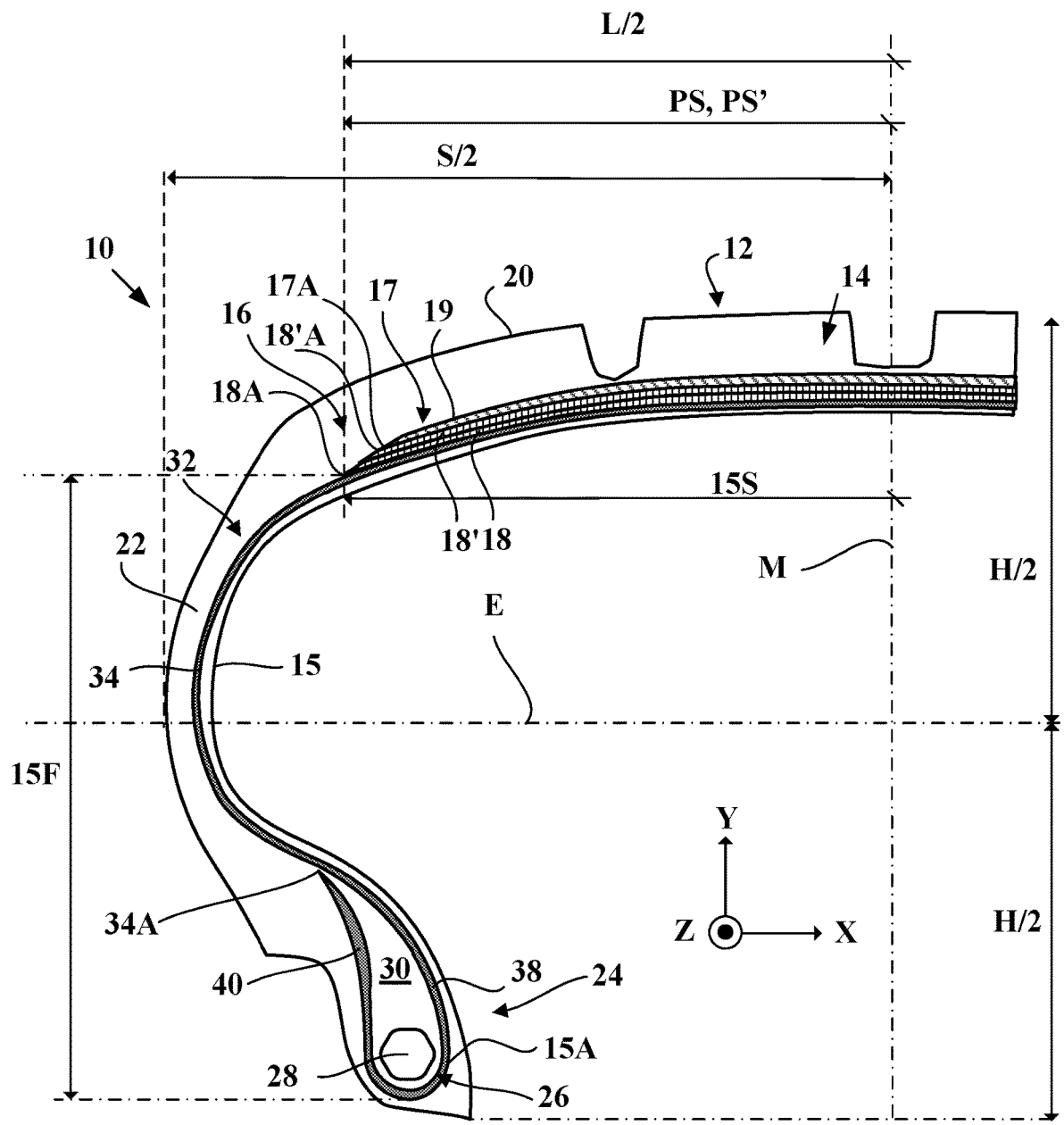
FIGS. 20, 21 and 22 are views similar to that of FIGS. 1, 2 and 4 of a tyre according to a second embodiment of the invention.
Figure 21:
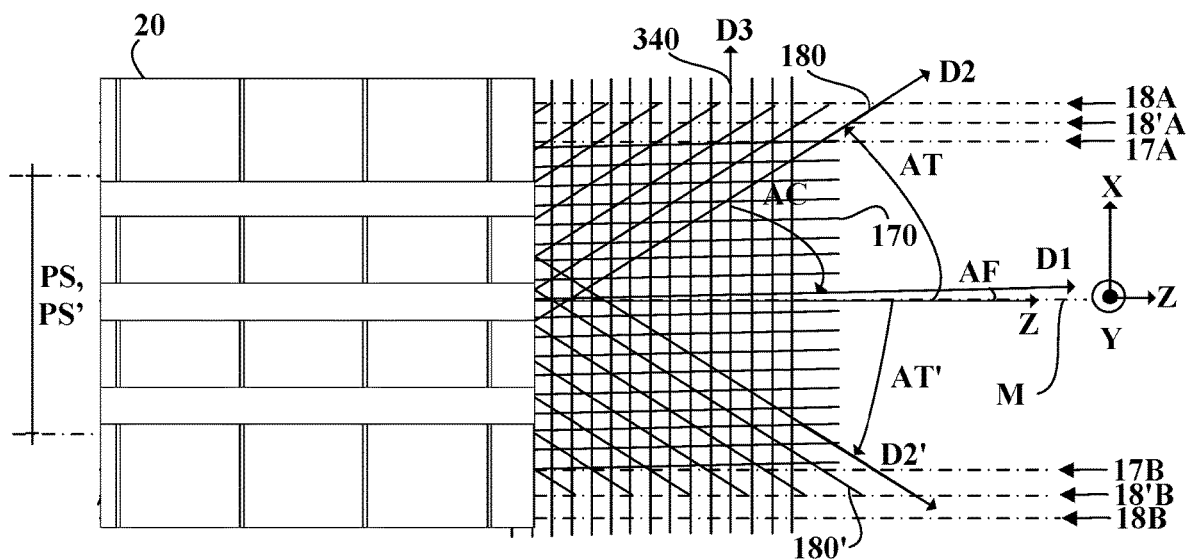
Figure 22:
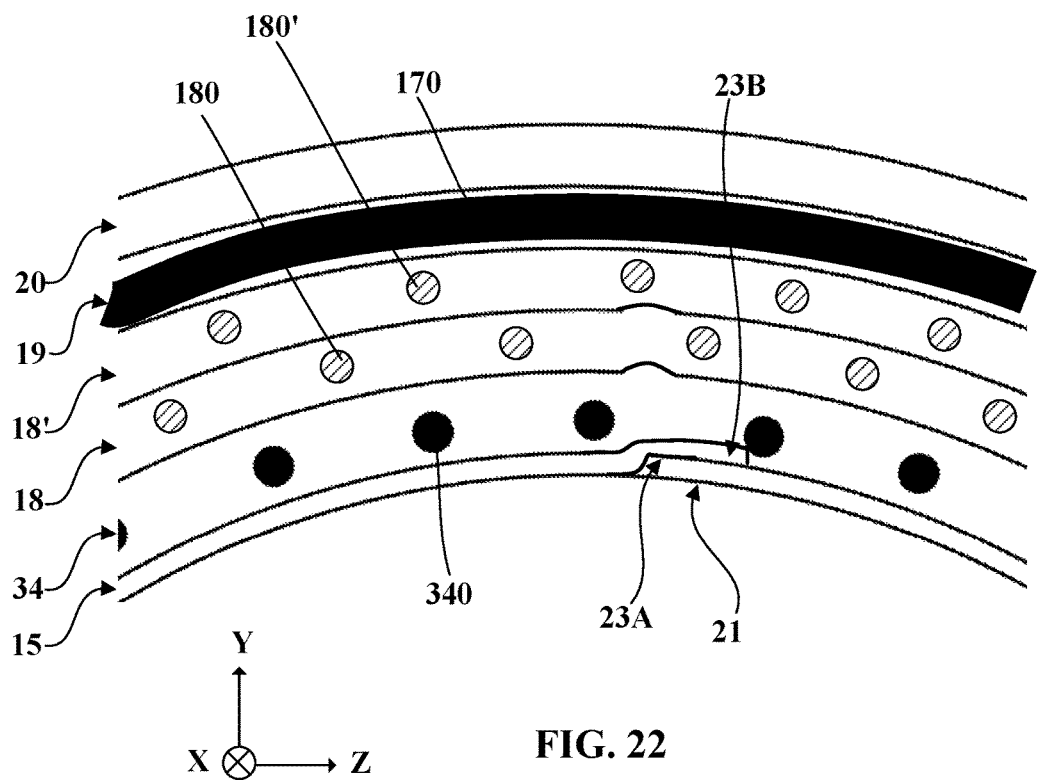
Figure 23:
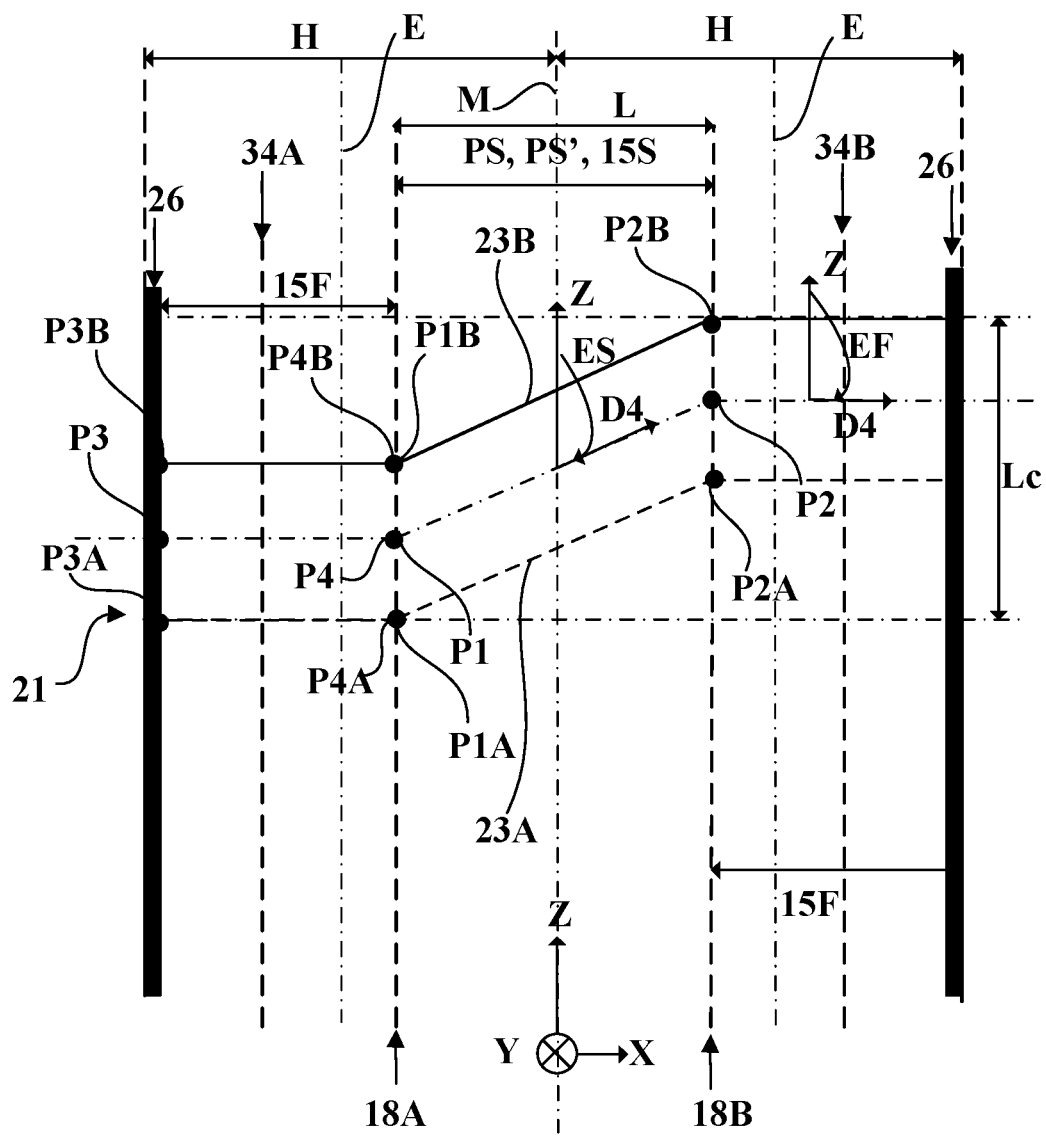
FIGS. 23 to 27 illustrate the different steps of the second method according to the invention making it possible to manufacture the tyre of FIG. 20.

Referring to FIG. 19, the assembly 58 of substantially cylindrical shape around the main axis A of the support 60 is deformed so as to obtain an assembly 58 of substantially toric shape around the main axis A of the support 60 so that the main direction K3 of each carcass filamentary reinforcing element 340 forms, with the circumferential direction z of the support 60, a final angle B3S of each carcass filamentary reinforcing element 340, in absolute value, strictly less than 80°, in a portion 52S of the wound carcass assembly 52 extending axially in radial line with the wound working assembly 50. Advantageously, the final angle B3S is, in absolute value, greater than or equal to 10°, preferably ranges from 20° to 75° and more preferably ranges from 35 to 70°. Here, B3S=43°. The portion 52S of the wound carcass assembly 52 is intended to form the portion 34S of the carcass layer 34.

The portion 52S of the wound carcass assembly 52 extending axially in radial line with the wound working assembly 50 has an axial width equal to at least 40%, preferably at least 50%, of the axial width l of the wound working assembly 50 and equal to at most 90%, preferably at most 80%, of the axial width l of the wound working assembly 50 and in this case is equal to 60% of the axial width l of the wound working assembly 50. The median plane m of the assembly 58 intersects this portion 52S. More preferably, this portion 52S is axially centred on the median plane m of the assembly 58.

The assembly 58 of substantially cylindrical shape around the main axis A of the support 60 is deformed so as to obtain the assembly 58 of substantially toric shape around the main axis A of the support 60 also so that the main direction K3 of each carcass filamentary reinforcing element 340 forms, with the circumferential direction z of the support 60, a final angle B3F of each carcass filamentary reinforcing element 340 ranging, in absolute value, from 80° to 90°, in a portion 52F of the wound carcass assembly 52 intended to extend radially in each sidewall 22 of the tyre 10. Each portion 52F of the wound carcass assembly 52 is intended to form each portion 34F of the carcass layer 34.

Each portion 52F of the wound carcass assembly 52 intended to extend radially in each sidewall 22 has a radial height equal to at least 5%, preferably at least 15% and even more preferably at least 30%, of the radial height H of the manufactured tyre and equal to at most 80%, preferably at most 70% and even more preferably at most 60%, of the radial height H of the manufactured tyre, and in this case is equal to 41% of the radial height H of the manufactured tyre. The equatorial circumferential plane e of the assembly 58 intersects each portion 52F of the wound carcass assembly 52 intended to be located in each sidewall 22.

During the deformation step, the final angle B3T formed by the main direction K3 of each carcass filamentary reinforcing element 340, with the circumferential direction z of the support 60, in the wound portion 59 of the wound carcass assembly 52, is substantially identical to the initial angle A3 before the deformation step.

The assembly 58 of substantially cylindrical shape around the main axis A of the support 60 is deformed so as to obtain the assembly 58 of substantially toric shape around the main axis A of the support 60 also so that the main direction K2 of each working filamentary reinforcing element 340 forms, with the circumferential direction z of the support 60, a final angle B2 of each working filamentary reinforcing element 340, in absolute value, strictly greater than 10°. Advantageously, the final angle B2 ranges, in absolute value, from 15° to 50°, preferably from 18° to 30° and here B2=24°.

The main direction K2 of each working filamentary reinforcing element 180 and the main direction K3 of each carcass filamentary reinforcing element 340 form, with the circumferential direction z of the support 60, in the portion AC of the assembly 58 lying axially between the axial edges 50A, 50B of the wound working assembly 50, final angles B2 and B3S of opposite orientations. In this case, B2=−24° and B3S=+43°.

The assembly 58 of substantially cylindrical shape around the main axis A of the support 60 is deformed so as to obtain the assembly 58 of substantially toric shape around the main axis A of the support 60 also so that, subsequent to the deformation step, the main direction K4 of the junction 73 forms, with the circumferential direction z of the support 60, a final angle B4S ranging, in absolute value, from 20° to 60°, in a portion 72S of the wound sealing assembly 72 extending axially in radial line with the wound working assembly 50. The final angle B4S is, in absolute value, greater than or equal to 25°, preferably greater than or equal to 30° and less than or equal to 50°, preferably less than or equal to 40° and here B4S=37°. The angle B4S is substantially equal to the angle ES.

The portion 72S of the wound sealing assembly 72 has an axial width equal to at least 40%, preferably at least 50%, of the axial width l of the wound working assembly 50 and equal to at most 90%, preferably at most 80%, of the axial width l of the wound working assembly 50 and here in this case 60% of the axial width l of the wound working assembly 50. The median plane m of the assembly 58 intersects this portion 72S of the wound sealing assembly 72. More preferably, this portion 72S of the wound sealing assembly 72 is axially centred on the median plane m of the assembly 58.

In the portion 72S, the main direction K4 is coincident with the curve of shortest length (FIG. 19 being schematic, it is a straight line) passing through:
- a point F1 located equidistant in the circumferential direction z from each first point F1B, F1A of each circumferential end edge 73A, 73B located at one of the two axial ends of the portion 72S of the wound sealing assembly 72, these two first points F1B, F1A facing each other in the circumferential direction z, and
- a point F2 located equidistant in the circumferential direction z from each second point F2B, F2A of each circumferential end edge 73A, 73B located at the other of the two axial ends of the portion 72S of the sealing assembly 72, these two second points F2A, F2B facing each other in the circumferential direction z.

The second points F2A, F2B are located on the other side of the median plane m of the support 60 with respect to the first points F1B, F1A.

The assembly 58 of substantially cylindrical shape around the main axis A of the support 60 is deformed so as to obtain the assembly 58 of substantially toric shape around the main axis A of the support 60 also so that, subsequent to the deformation step, the main direction K4 of the junction 73 forms, with the circumferential direction z of the support 60, a final angle B4F ranging, in absolute value, from 80° to 90°, in a portion 72F of the wound sealing assembly 72 intended to extend radially in each sidewall 22. Here, B4F=90°. In accordance with the invention, the angle B4F is, in absolute value, strictly greater than the angle B4S. The angle B4F is substantially equal to the angle EF.

Each portion 72F of the sealing assembly 72 has a radial height equal to at least 5%, preferably at least 15% and more preferably at least 30%, of the radial height H of the manufactured tyre and equal to at most 80%, preferably at most 70% and more preferably at most 60%, of the radial height H of the manufactured tyre and in this case equal to 41% of the radial height H of the manufactured tyre. The equatorial circumferential plane e of the assembly 58 intersects each portion 72F of the sealing assembly 72.

In the portion 72F, the main direction K4 is coincident with the curve of shortest length (FIG. 19 being schematic, it is a straight line) passing through:
- a point F3 located equidistant in the circumferential direction z from each first point F3A, F3B of each circumferential end edge 73A, 73B located at one of two axial ends of the portion 72F of the sealing assembly 72 intended to extend radially in each sidewall 22, these two first points F3A, F3B facing each other in the circumferential direction z, and
- a point F4 located equidistant in the circumferential direction z from each second point F4A, F4B of each circumferential end edge 73A, 73B located at the other of the two axial ends of the portion 72F of the sealing assembly 72 intended to extend radially in each sidewall 22, these two second points F4A, F4B facing each other in the circumferential direction z.

The second points F4A, F4B are located radially on the outside with respect to the first points F3A, F3B.

During the method, a plurality of hooping filamentary reinforcing elements 170, preferably adhered, are embedded in an elastomeric matrix to form a hooping ply.

Then, there is arranged, radially around the assembly 58 previously formed on the support 60, a wound hooping assembly intended to form the hoop reinforcement 17. Here, the wound hooping assembly is formed by helical winding of the hooping ply on a toric shape and then the wound hooping assembly is transferred using a transfer ring radially outside the assembly previously formed. As a variant, the hooping ply may be directly wound circumferentially helically around the assembly formed beforehand so as to form the wound hooping assembly.

In the illustrated embodiment, the wound hooping assembly has an axial width smaller than the axial width of the wound working assembly 50. Thus, the wound hooping assembly is axially the narrowest of the wound working 50 and wound hooping assemblies.

The angle A1 formed by the main direction K1 of each hooping filamentary reinforcing element 170 with the circumferential direction z of the support 60 is, in absolute value, less than or equal to 10°, preferably less than or equal to 7° and more preferably less than or equal to 5° and here equal to 5°.

The main direction K1 of each hooping filamentary reinforcing element 170, the main direction K2 of each working filamentary reinforcing element 180 and the main direction D3 of each carcass filamentary reinforcing element 340 form, with the circumferential direction z of the support 60, in a portion AC' of the assembly 58 and of the wound hooping assembly lying axially between the axial edges of the wound hooping assembly, paired angles which are different in absolute value.

The portion AC' of the assembly 58 and of the wound hooping assembly lying axially between the axial edges of the wound hooping assembly 50 has an axial width equal to at least 40%, preferably at least 50%, of the axial width L of the wound working assembly 50 and at most 90%, preferably at most 80%, of the axial width L of the wound working assembly 50 and in this case 60% of the axial width L of the wound working assembly 50. The median plane m of the assembly 58 intersects this portion AC'. More preferably, this portion AC' is axially centred on the median plane m of the assembly 58.

Then, there is arranged, radially on the outside of the wound hooping assembly, a strip of polymeric material intended to form the tread 20, so as to form a green blank of the tyre 10. In a variant, the strip of polymeric material intended to form the tread 20 may be arranged radially on the outside of the hooping assembly, then this assembly may be transferred radially on the outside of the assembly 58 previously formed on the support 60. In another variant, it is possible, after having arranged the hooping assembly wound radially around the assembly 58 previously formed on the support 60, to arrange the strip of polymeric material intended to form the tread 20.

The green blank of the tyre formed from the assembly 58 is then obtained. A step of moulding the green blank is then carried out during which the green blank is positioned in a crosslinking mould comprising a deformable membrane intended to apply a pressure on a radially internal surface of the wound sealing assembly. The green blank is radially and circumferentially expanded, for example by pressurizing the deformable membrane, so as to press the green blank against the surfaces of the crosslinking mould.

A step of crosslinking the green blank is then carried out so as to crosslink the compositions in the uncrosslinked state and to obtain the tyre. Prior to this crosslinking step, an anti-adhesive composition comprising a silicone is used to coat:
- a radially and axially external surface of the deformable membrane intended to come into contact with the radially internal surface of the wound sealing assembly during the crosslinking step, or
- the radially internal surface of the wound sealing assembly intended to come into contact with a radially and axially external surface of the deformable membrane during the crosslinking step.

A tyre and a method according to a second embodiment according to the invention will now be described. Elements similar to those of the first embodiment are denoted by identical references.

Unlike the tyre 10 according to the first embodiment and as illustrated in FIGS. 20 to 23, the working reinforcement 16 of the tyre 10 according to the second embodiment comprises two working layers 18, 18'. In this case, the working reinforcement comprises a first radially innermost working layer 18 and a second working layer 18' arranged radially on the outside of the working layer 18. Here, the working reinforcement consists of the working layers 18 and 18'. The working layer 18' is delimited axially by two axial edges 18'A, 18'B of the working layer 18' and comprises working filamentary reinforcing elements 180' extending axially from the axial edge 18'A to the other axial edge 18'B of the working layer 18' substantially parallel to one another in a main direction D2'.

The main direction D2 in which each working filamentary reinforcing element 180 of the working layer 18 extends and the main direction D2' in which each working filamentary reinforcing element 180' of the working layer 18' extends form, with the circumferential direction of the tyre, in the portion of the tyre PS delimited axially by the axial edges 18A, 18B of the radially innermost working layer 18, angles AT and AT' of opposite orientations. In this case, AT=−26° and AT'=+26°.

Unlike the tyre 10 according to the first embodiment, the main direction D3 of each carcass filamentary reinforcing element 340 of the carcass layer 34 forms, with the circumferential direction Z of the tyre 10, a substantially constant angle AC over the entire axial width of the carcass layer 34 between the axial edges 34A, 34B of the carcass layer and ranging, in absolute value, from 80° to 90°. Here, AC=90°.

Unlike the tyre 10 according to the first embodiment in which the main direction of the junction 23 has, between the portions 15F and 15S, transition zones where the angle is substantially variable, the portion 15S of the sealing layer 15 extending axially in line with the radially innermost working layer 18 and in which the main direction D4 of the junction 23 forms, with the circumferential direction Z of the tyre 10, an angle ES ranging, in absolute value, from 20° to 60° has an axial width equal to at least 70%, preferably at least 80%, of the axial width L of the radially innermost working layer 18 and here equal to the axial width L of the radially innermost working layer 18.

In addition, each portion 15F of the sealing layer 15 extending radially in each sidewall 22 and in which the main direction D4 of the junction 23 forms, with the circumferential direction Z of the tyre 10, an angle EF ranging, in absolute value, from 80° to 90° has a radial height equal to the radial height of the sidewall of the tyre 10.

Figure 24:
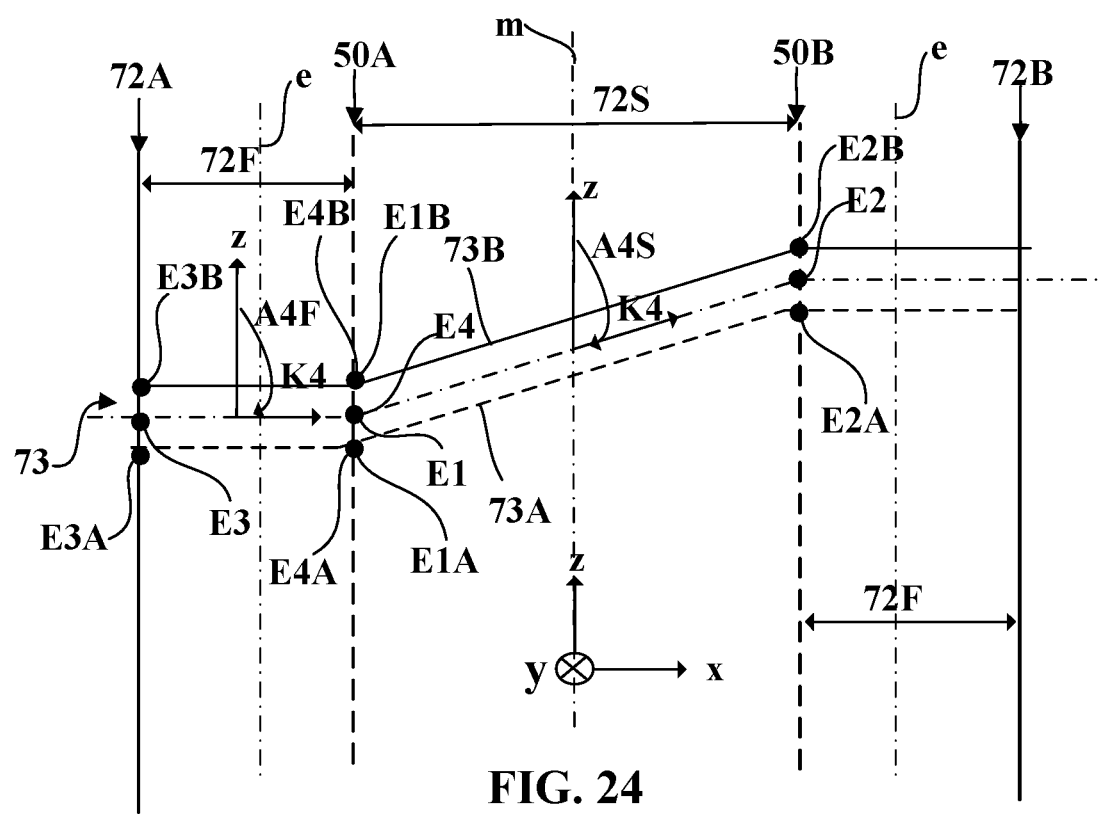

Unlike the first method according to the invention, the second method according to the invention uses the fact of producing the junction with different angles and therefore with a main direction of the junction not forming a constant angle. Thus, with reference to FIG. 24, during the step of forming the wound sealing assembly 72, the junction 73 is formed so that the main direction K4 of the junction 73 forms, with the circumferential direction z of the support 60, an initial angle A45, in absolute value, strictly less than 80°, in a portion 72S of the wound sealing assembly 72 intended to extend axially in radial line with the radially innermost wound working assembly 50. In this case A45 ranges from 23° to 75° and here A45=47°.

During the step of forming the wound sealing assembly 72, the junction 73 is formed so that the main direction K4 of the junction 73 forms, with the circumferential direction z of the support 60, an initial angle A4F ranging, in absolute value, from 80° to 90° in a portion 72F of the wound sealing assembly 72 intended to extend radially in each sidewall 22. In this case A4F=90°. In accordance with the invention, the angle A4F is, in absolute value, strictly greater than the angle A45.

The portion 72S of the wound sealing assembly 72 has an axial width equal to at least 70%, preferably at least 80%, of the axial width L of the radially innermost wound working assembly 50. The median plane m of the assembly 58 intersects this portion 72S of the wound sealing assembly 72. More preferably, this portion 72S of the wound sealing assembly 72 is centred axially on the median plane m of the assembly 58.

Each portion 72F of the wound sealing assembly 72 has a radial height equal to at least 60%, preferably at least 70%, of the radial height H of the manufactured tyre 10. The equatorial circumferential plane e of the assembly 58 intersects each portion 72F of the sealing assembly 72.

Figure 25:
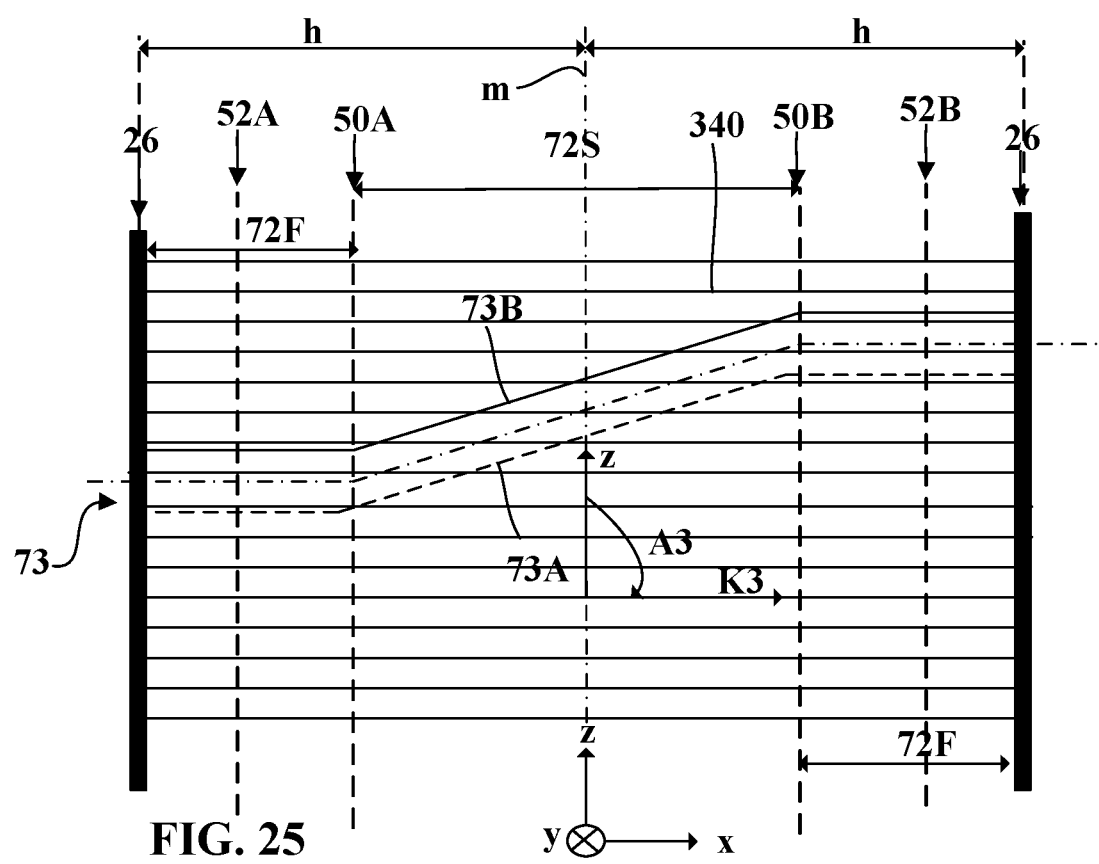

Then, with reference to FIG. 25, there is formed, by winding the carcass ply 51 radially outside the wound sealing assembly 72, the wound carcass assembly 52 intended to form the carcass layer 34. The wound sealing assembly 72 and the wound carcass assembly 52 then form the assembly 58 of substantially cylindrical shape around the main axis A of the support 60. The main direction K3 of each carcass filamentary reinforcing element 340 forms, with the circumferential direction z of the support 60, an initial angle A3 ranging, in absolute value, from 80° to 90° over the entire axial width of the wound carcass assembly 52 between the two axial edges 52A, 52B.

Figure 26:
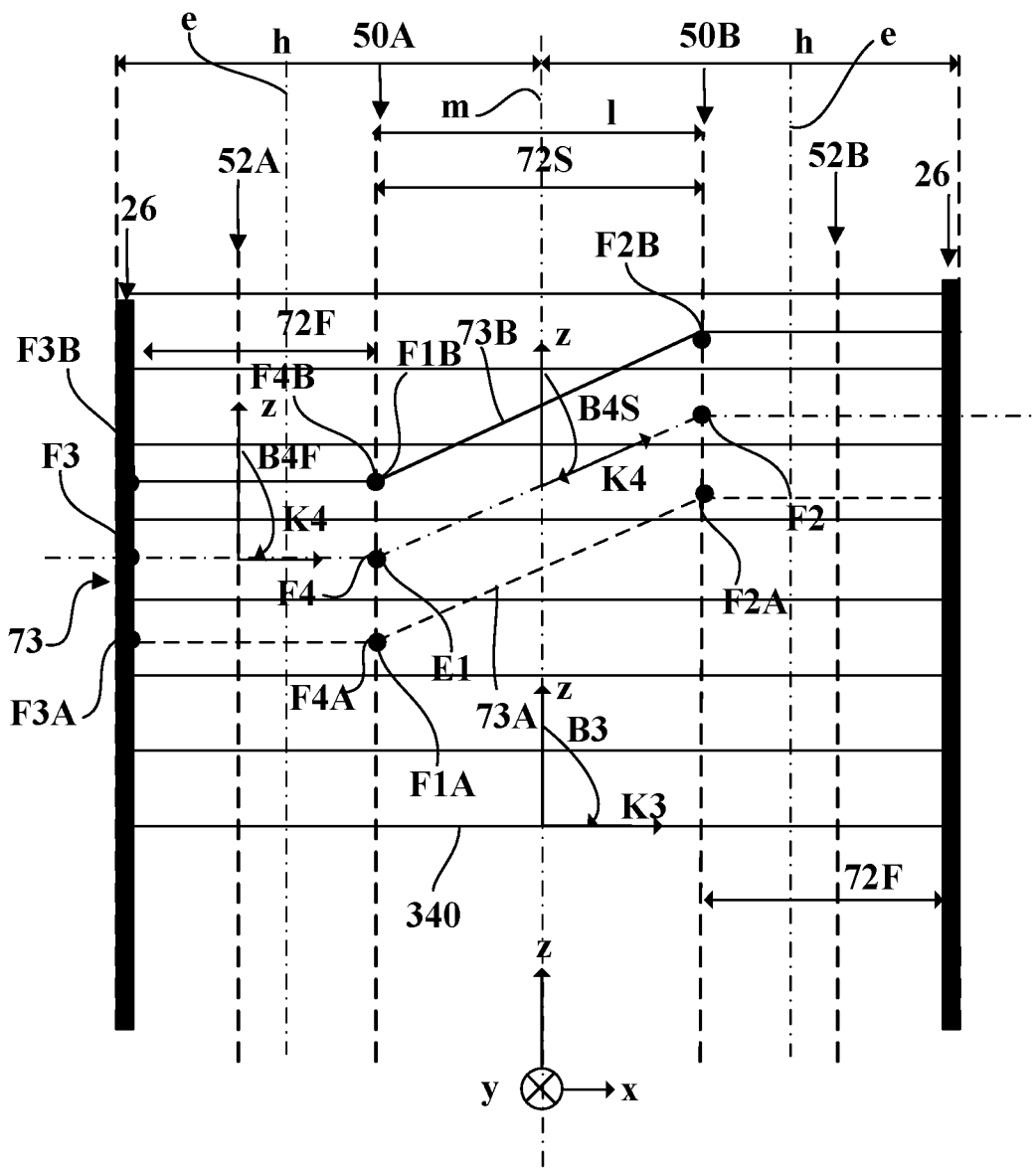

Then, with reference to FIG. 26, prior to the formation of the wound working assemblies 50, 50', the assembly 58 of substantially cylindrical shape around the main axis A of the support 60 is deformed so as to obtain the assembly 58 of substantially toric shape so that, after the deformation step, the main direction K4 of the junction 73 forms, with the circumferential direction z of the support 60, a final angle B4S ranging, in absolute value, from 20° to 60°, in the portion 72S of the wound sealing assembly 72. In this case, the final angle B4S is, in absolute value, greater than or equal to 25°, preferably greater than or equal to 30° and is less than or equal to 50°, preferably less than or equal to 40°. Here B4S=37°.

In addition, the assembly 58 is deformed so that, after the deformation step, the main direction K4 of the junction 73 forms, with the circumferential direction z of the support 60, a final angle B4F ranging, in absolute value, from 80° to 90°, in the portion 72F of the wound sealing assembly 72. Here, B4F=90°. In accordance with the invention, the angle B4F is, in absolute value, strictly greater than the angle B4S.

In addition, the assembly 58 is deformed so that, after the deformation step, the main direction K3 of each carcass filamentary reinforcing element 340 forms, with the circumferential direction z of the support 60, a final angle B3 of each carcass filamentary reinforcing element 340 ranging, in absolute value, from 80° to 90° over the entire axial width of the wound carcass assembly 52 between the two axial edges 52A, 52B.

Then, after the step of deforming the assembly 58, there is formed, by winding two working plies 49, 49', radially outside the wound carcass assembly 52, two wound working assemblies 50, 50' intended to respectively form each working layer 18, 18'. In this case, there is formed, by winding the working ply 49, radially outside the deformed assembly 58, a first radially innermost wound working assembly 50. Then, there is formed, by winding the working ply 49', radially outside the first wound working assembly 50, a second radially outermost wound working assembly 50'.

Figure 27:
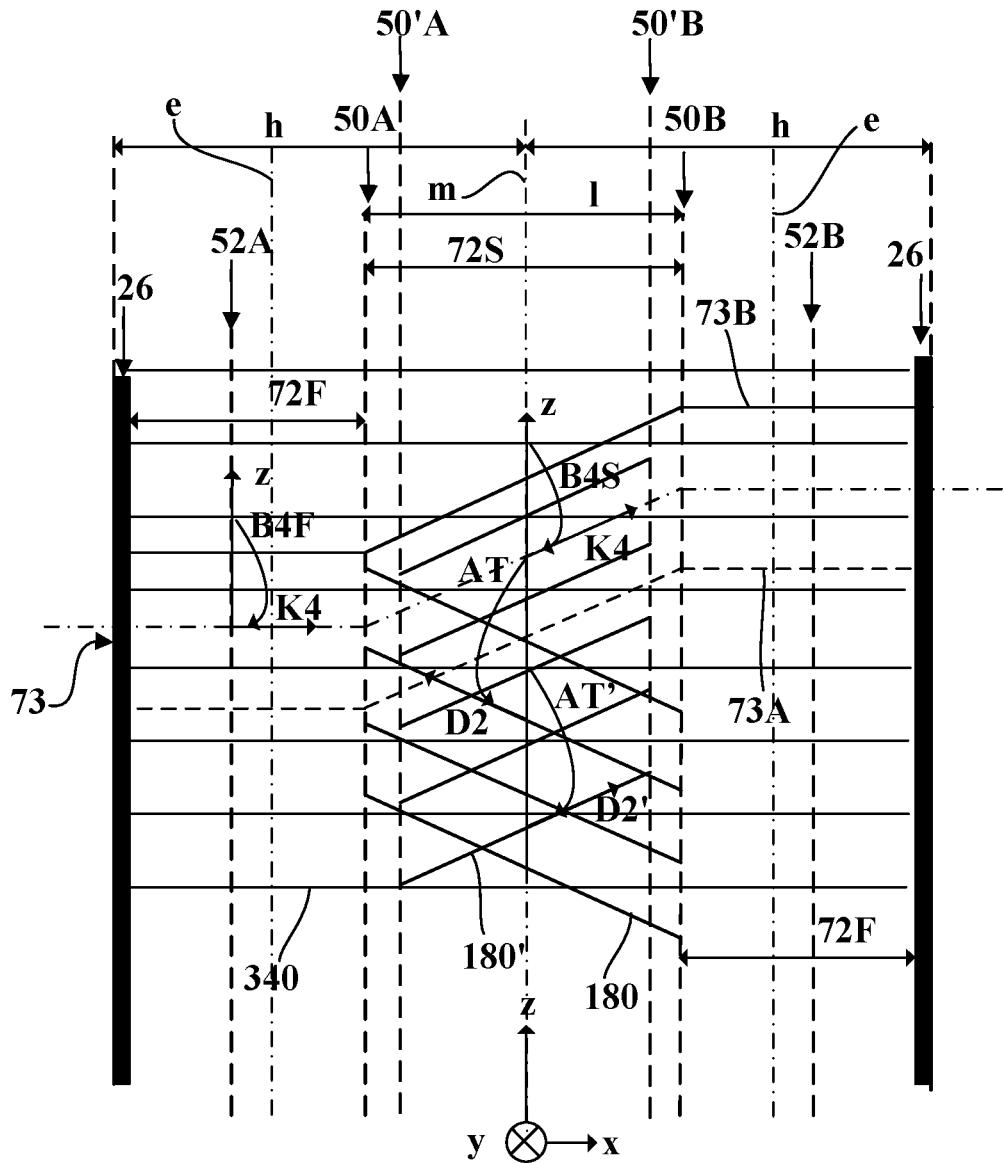

Referring to FIG. 27, the first radially innermost wound working assembly 50 is axially delimited by two axial edges 50A, 50B of the wound working assembly 50 and includes the working filamentary reinforcing elements 180 extending axially from the axial edge 50A to the other axial edge 50B of the wound working assembly 50 substantially parallel to one another. The working filamentary reinforcing elements 180 extend, in the working ply 49, in a main direction K2 substantially coincident with the main direction D2 of each working filamentary reinforcing element 180 in the working ply 49.

The second radially outermost wound working assembly 50' is axially delimited by two axial edges 50'A, 50'B of the wound working assembly 50' and includes the working filamentary reinforcing elements 180' extending substantially parallel to one another. The working filamentary reinforcing elements 180' extend, in the working ply 49', in a main direction K2' substantially coincident with the main direction D2' of each working filamentary reinforcing element 180' in the working ply 49'.

Each main direction K2, K2' of each working filamentary reinforcing element 180, 180 in each working ply 49, 49' forms, with the circumferential direction z of the support 60, the angle AT, AT' of each working filamentary reinforcing element 180, 180' described above.

Then, the subsequent steps are carried out identically to those of the first embodiment.

Figure 28:
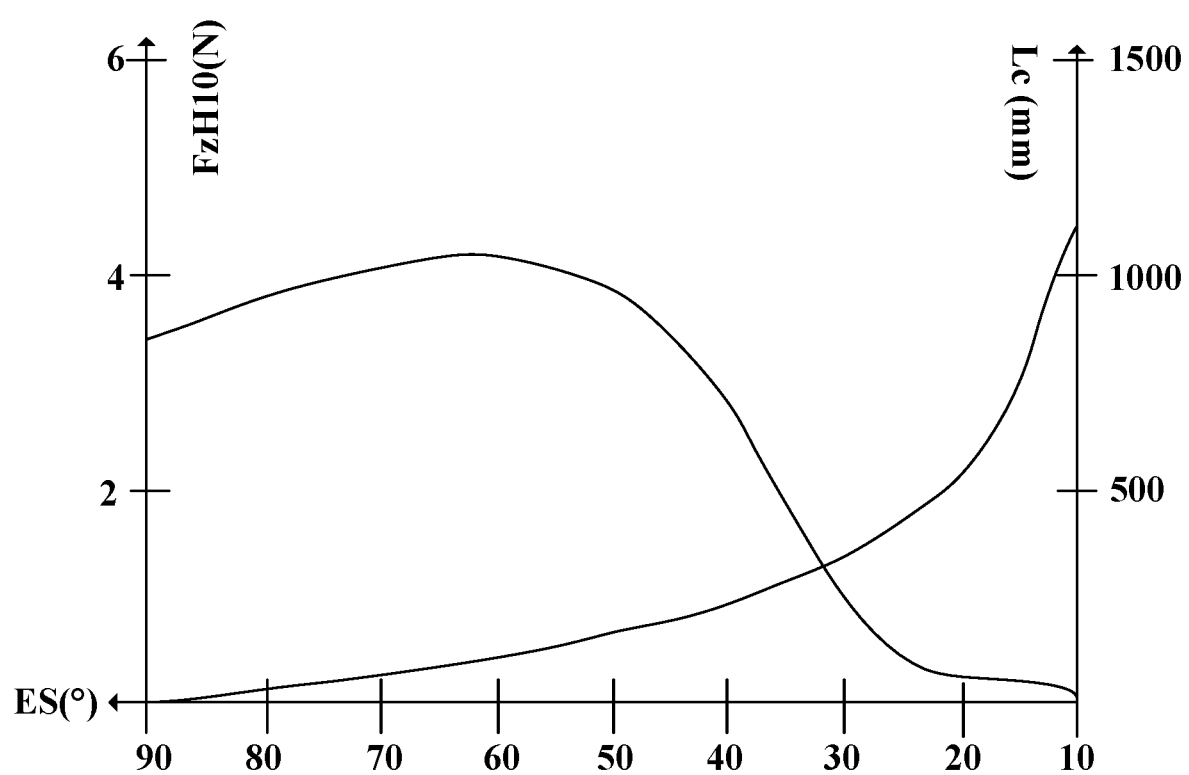
FIG. 28 illustrates the influence of the angle of the junction on the noise emitted by the tyre and the circumferential length of the junction.

FIG. 28 shows the variation of the noise emitted and of the circumferential length Lc of the junction 21 as a function of the angle ES. For simulation purposes, the angle EF has been taken equal to the angle ES. Beforehand and in order to justify the relevance of the descriptor FzH10, it is useful to remember that the non-uniformity of the tyre caused by the junction 21 excites the cavity mode of the tyre around 220 Hz. The relevant harmonic for such a frequency is the harmonic 10 considered at a speed of 160 km/h for the size of the tyre described above.

The FzH10 is calculated by simulating the vertical force exerted on the centre of the wheel fitted with the tyre according to the invention inflated to a nominal pressure under a nominal load and rolling at 160 km/h. There is then carried out a decomposition by harmonic, as the wheel turns, of the signal of the vertical force measured at the centre of the wheel.

FIG. 28 illustrates the fact that the angle ES in accordance with the invention, namely ranging from 20° to 60°, makes it possible to obtain the best compromise between the reduction of noise and the reduction of the length Lc and therefore the productivity of the manufacturing method.

The invention is not limited to the embodiments described above.

Specifically, it is possible in particular to implement the invention by using two carcass layers instead of a single carcass layer.

Regarding the crosslinking step, it may be implemented using membranes, devices and methods as described in the filings made on behalf of the applicant under the following numbers PCT/FR2020/051379, PCT/FR2020/051380, FR1913474, FR2001697, PCT/EP202/065215 and under the publication number WO2019/158852.

The invention claimed is:

1. A tire comprising a crown, two sidewalls, two beads, each sidewall connecting each bead to the crown, and a carcass reinforcement anchored in each bead and extending in each sidewall and radially inwardly at the crown,
    wherein the crown comprises:
        a tread intended to come into contact with a ground when the tire is rolling; and
        a crown reinforcement, which is arranged radially between the tread and the carcass reinforcement and which comprises a working reinforcement comprising at least one working layer that includes either one working layer or more working layers including a radially innermost working layer,
    wherein the carcass reinforcement comprises at least one carcass layer,
    wherein the tire further comprises a sealing layer for sealing against an inflation gas, the sealing layer being intended to delimit an internal cavity closed with a mounting support for the tire once the tire has been mounted on the mounting support,
    wherein the sealing layer includes:
        a crown portion, which extends axially in radial line with the one working layer or with the radially innermost working layer, and which has an axial width equal to at least 40% of an axial width of the one working layer or of the radially innermost working layer, and
        two sidewall portions, which extend radially in the sidewalls respectively and which each have a radial height equal to at least 5% of a radial height of the tire, wherein the sealing layer comprises a junction between two circumferential end edges of the sealing layer, the junction forming a radial overlap between one of the circumferential end edges of the sealing layer and the other of the circumferential end edges of the sealing layer, the junction extending in a main direction D4 forming, with a circumferential direction of the tire:
            in the crown portion of the sealing layer, an angle ES that ranges, in absolute value, from 20° to 60°, and
            in each sidewall portion of the sealing layer, an angle EF that is, in absolute value, strictly greater than the angle ES.

2. The tire according to claim 1, wherein the angle ES is, in absolute value, greater than or equal to 25°.

3. The tire according to claim 1, wherein the angle ES is, in absolute value, less than or equal to 50°.

4. The tire according to claim 3, wherein the angle EF ranges, in absolute value, from 80° to 90°.

5. The tire according to claim 1, wherein an average distance between each circumferential end edge ranges from 1 to 15 mm in the crown portion of the sealing layer.

6. The tire according to claim 1, wherein an average thickness of the sealing layer ranges from 0.4 to 1.6 mm in the crown portion of the sealing layer.

7. The tire according to claim 1, wherein the at least one working layer is delimited axially by two axial edges of the at least one working layer and comprises working filamentary reinforcing elements extending axially from one axial edge to the other axial edge of the at least one working layer substantially parallel to one another in a main direction D2 of each working filamentary reinforcing element, the main direction D2 of each working filamentary reinforcing element of the at least one working layer forming, with the circumferential direction of the tire, an angle AT that is, in absolute value, strictly greater than 10°.

8. The tire according to claim 1, wherein the crown reinforcement further comprises a hoop reinforcement arranged radially outside the working reinforcement, the hoop reinforcement being delimited axially by two axial edges of the hoop reinforcement and comprising at least one hooping filamentary reinforcing element wound circumferentially helically so as to extend axially from one axial edge to the other axial edge of the hoop reinforcement.

9. The tire according to claim 1, wherein the at least one carcass layer is delimited axially by two axial edges of the at least one carcass layer and comprises carcass filamentary reinforcing elements extending axially from one axial edge to the other axial edge of the at least one carcass layer, each carcass filamentary reinforcing element extending in a main direction D3 of each carcass filamentary reinforcing element, the main direction D3 of each carcass filamentary reinforcing element of the at least one carcass layer forming, with the circumferential direction of the tire:
- an angle ACS that is, in absolute value, strictly less than 80° in a portion of the at least one carcass layer extending axially in radial line with the one working layer or with the radially innermost working layer, and
- an angle ACF that is, in absolute value, ranging from 80° to 90° in at least one portion of the at least one carcass layer extending radially in each sidewall.

10. The tire according to claim 9, wherein the angle ACS is, in absolute value, greater than or equal to 10°.

11. The tire according to claim 1, wherein the two sidewalls are a first sidewall and a second sidewall,
wherein the two sidewall portions of the sealing layer are a first sidewall portion that extends radially in the first sidewall and a second sidewall portion that extends radially in the second sidewall,
wherein the junction includes:
- a crown portion, which is formed by the junction in the crown portion of the sealing layer, and in which the main direction D4 forms the angle ES with the circumferential direction of the tire, and
- a first sidewall portion and a second sidewall portion, which are formed by the junction respectively in the first sidewall portion of the sealing layer and in the second sidewall portion of the sealing layer, and
wherein the first sidewall portion of the junction and the second sidewall portion of the junction are arranged on either side of the crown portion of the junction in the circumferential direction of the tire.

12. The tire according to claim 11, wherein the sealing layer is delimited axially by a first axial edge of the sealing layer and a second axial edge of the sealing layer,
wherein the junction extends in the main direction D4 from the first axial edge of the sealing layer to the second axial edge of the sealing layer,
wherein the junction includes:
- a first axial edge that is formed by the junction at the first axial edge of the sealing layer, and
- a second axial edge that is formed by the junction at the second axial edge of the sealing layer,
wherein the first axial edge of the junction and the crown portion of the junction are arranged on either side of the first sidewall portion of the junction in the circumferential direction of the tire, and
wherein the crown portion of the junction and the second axial edge of the junction are arranged on either side of the second sidewall portion of the junction in the circumferential direction of the tire.

13. The tire according to claim 11, wherein the sealing layer is delimited axially by a first axial edge of the sealing layer and a second axial edge of the sealing layer,
wherein the junction extends in the main direction D4 from the first axial edge of the sealing layer to the second axial edge of the sealing layer,
wherein the junction includes:
- a first axial edge that is formed by the junction at the first axial edge of the sealing layer, and
- a second axial edge that is formed by the junction at the second axial edge of the sealing layer,
wherein the first axial edge of the junction and the first sidewall portion of the junction are aligned axially with each other, and
wherein the second axial edge of the junction and the second sidewall portion of the junction are aligned axially with each other.

14. A method for manufacturing the tire according to claim 1 comprising the steps:
- winding a sealing ply or a plurality of sealing plies around a support having a substantially cylindrical shape around a main axis, to form a wound sealing assembly intended to form the sealing layer, the wound sealing assembly comprising a junction between two circumferential end edges of the wound sealing assembly, the junction forming a radial overlap between one of the circumferential end edges of the wound sealing assembly and the other of the circumferential end edges of the wound sealing assembly, a main direction K4 of the junction forming, with a circumferential direction of the support, a substantially constant initial angle A4 over a whole of an axial width of the wound sealing assembly between two axial edges of the wound sealing assembly;
- winding a carcass ply or a plurality of carcass plies, radially outside the wound sealing assembly, to form one or more wound carcass assemblies, the wound carcass assemblies being intended to form the at least one carcass layer;
- winding a working ply or a plurality of working plies, radially outside the wound carcass assemblies, to form one or more wound working assemblies, the wound working assemblies being intended to form the at least one working layer, the wound sealing assembly, the wound carcass assemblies and the wound working assemblies forming an assembly of substantially cylindrical shape around the main axis of the support; and
- deforming the assembly of substantially cylindrical shape around the main axis of the support so as to obtain an assembly of substantially toric shape around the main axis of the support,
wherein the assembly of substantially cylindrical shape is deformed during a deformation step so as to obtain the assembly of substantially toric shape so that, after the deformation step, the main direction of the junction forms, with the circumferential direction of the support:
- in a portion of the wound sealing assembly extending axially in radial line with the wound working assembly or a radially innermost wound working assembly and having an axial width equal to at least 40% of an axial width of the wound working assembly or the radially innermost wound working assembly, a final angle B4S ranging, in absolute value, from 20° to 60°, and
- in a portion of the wound sealing assembly intended to extend radially in each sidewall and having a radial height equal to at least 5% of the radial height of the manufactured tire, a final angle B4F, in absolute value, strictly greater than the final angle B4S of the main direction K4 of the junction in the portion of the wound sealing assembly extending axially in radial line with the wound working assembly or the radially innermost wound working assembly.

15. The method according to claim 14, wherein the final angle B4F formed by the main direction K4 of the junction with the circumferential direction of the support ranges, in absolute value, from 80° to 90° in the portion of the wound sealing assembly intended to extend radially in each sidewall.

16. The method according to claim 14, wherein, the or each wound carcass assembly being axially delimited by two axial edges of the or each wound carcass assembly and comprising carcass filamentary reinforcing elements extending substantially parallel to one another axially from one axial edge to the other axial edge of the or each wound carcass assembly, each carcass filamentary reinforcing element extending, in the or each carcass ply, in a main direction K3 of each carcass filamentary reinforcing element in the or each carcass ply, the main direction K3 of each carcass filamentary reinforcing element forming, with the circumferential direction of the support, an initial angle A3 of each carcass filamentary reinforcing element, the assembly of substantially cylindrical shape is deformed so as to obtain the assembly of substantially toric shape so that the main direction K3 of each carcass filamentary reinforcing element forms, with the circumferential direction of the support:

- a final angle B3S of each carcass filamentary reinforcing element, in absolute value, strictly less than 80°, in a portion of the or each wound carcass assembly extending axially in radial line with the wound working assembly or the radially innermost wound working assembly, and
- a final angle B3F of each carcass filamentary reinforcing element ranging, in absolute value, from 80° to 90°, in a portion of the or each wound carcass assembly intended to extend radially into each sidewall.

17. The method according to claim 14, wherein, the or each wound working assembly being axially delimited by two axial edges of the or each wound working assembly and comprising working filamentary reinforcing elements extending substantially parallel to one another axially from one axial edge to the other axial edge of the or each wound working assembly, each working filamentary reinforcing element extending, in the or each working ply, in a main direction K2 of each working filamentary reinforcing element in the or each working ply, the main direction K2 of each working filamentary reinforcing element in the or each working ply forming, with the circumferential direction of the support, an initial angle A2 of each working filamentary reinforcing element, the assembly of substantially cylindrical shape is deformed so as to obtain the assembly of substantially toric shape so that the main direction K2 of each working filamentary reinforcing element forms, with the circumferential direction of the support, a final angle B2 of each working filamentary reinforcing element, in absolute value, strictly greater than 10°.

18. A method for manufacturing a tire according to claim 1 comprising the steps:

winding a sealing ply or a plurality of sealing plies around a support having a substantially cylindrical shape around a main axis, to form a wound sealing assembly intended to form the sealing layer, the wound sealing assembly comprising a junction between two circumferential end edges of the wound sealing assembly, the junction forming a radial overlap between one of the circumferential end edges of the wound sealing assembly and the other of the circumferential end edges of the wound sealing assembly;

winding a carcass ply or a plurality of carcass plies, radially outside the wound sealing assembly, to form one or more wound carcass assemblies, the wound carcass assemblies being intended to form the at least one carcass layer, the wound sealing assembly and the wound carcass assemblies forming an assembly of substantially cylindrical shape around the main axis of the support;

deforming the assembly of substantially cylindrical shape around the main axis of the support so as to obtain an assembly of substantially toric shape around the main axis of the support;

then, after the step of deforming the assembly, winding a working ply or a plurality of working plies, radially outside the wound carcass assemblies, to form one or more wound working assemblies intended to form the at least one working layer, wherein, during the step of forming the wound sealing assembly, the junction is formed so that a main direction K4 of the junction forms, with the circumferential direction of the support:

in a portion of the wound sealing assembly intended to extend axially in radial line with the wound working assembly or a radially innermost wound working assembly, an initial angle A4S, in absolute value, strictly less than 80°, and in a portion of the wound sealing assembly intended to extend radially in each sidewall, an initial angle A4F, in absolute value, strictly greater than the initial angle A4S of the main direction K4 of the junction in the portion of the wound sealing assembly intended to extend axially in radial line with the wound working assembly or the radially innermost wound working assembly, and wherein the assembly of substantially cylindrical shape is deformed during a deformation step so as to obtain the assembly of substantially toric shape so that, after the deformation step, the main direction K4 of the junction forms, with the circumferential direction of the support:

in the portion of the wound sealing assembly intended to extend axially in radial line with the wound working assembly or the radially innermost wound working assembly and having an axial width equal to at least 70% of the axial width of the wound working assembly or the radially innermost wound working assembly, a final angle B4S, in absolute value, ranging from 20° to 60°, and in the portion of the wound sealing assembly intended to extend radially in each sidewall and having a radial height equal to at least 60% of the radial height of the manufactured tire, a final angle B4F, in absolute value, strictly greater than the final angle B4S of the main direction K4 of the junction in the portion of the wound sealing assembly intended to extend axially in radial line with the wound working assembly or the radially innermost wound working assembly.

* * * * *